(12) United States Patent
Ida et al.

(10) Patent No.: US 9,784,857 B2
(45) Date of Patent: Oct. 10, 2017

(54) IMAGING DEVICE AND METHOD

(71) Applicant: RIKEN, Saitama (JP)

(72) Inventors: Takahiro Ida, Saitama (JP); Shinji Motomura, Saitama (JP); Shuichi Enomoto, Saitama (JP)

(73) Assignee: RIKEN, Saitama (JP)

( * ) Notice: Subject to any disclaimer, the term of this patent is extended or adjusted under 35 U.S.C. 154(b) by 0 days.

(21) Appl. No.: 15/509,112

(22) PCT Filed: Aug. 28, 2015

(86) PCT No.: PCT/JP2015/074427
§ 371 (c)(1),
(2) Date: Mar. 6, 2017

(87) PCT Pub. No.: WO2016/035706
PCT Pub. Date: Mar. 10, 2016

(65) Prior Publication Data
US 2017/0261624 A1    Sep. 14, 2017

(30) Foreign Application Priority Data
Sep. 5, 2014 (JP) .................................. 2014-181498

(51) Int. Cl.
*G01T 1/161* (2006.01)
*G01T 1/29* (2006.01)

(52) U.S. Cl.
CPC ............ *G01T 1/2914* (2013.01); *G01T 1/161* (2013.01)

(58) Field of Classification Search
CPC ........ G01T 1/161; G01T 1/2914; A61B 6/037
See application file for complete search history.

(56) References Cited

U.S. PATENT DOCUMENTS 5,861,627 A * 1/1999 Basko ................... G01T 1/1642
                                                       250/363.04
8,076,645 B2   12/2011 Motomura et al.
(Continued)

FOREIGN PATENT DOCUMENTS

JP        4486623 B2    6/2010

OTHER PUBLICATIONS

International Search Report issued in corresponding application No. PCT/JP2015/074427 dated Dec. 1, 2015 (4 pages).
(Continued)

*Primary Examiner* — Marcus Taningco
(74) *Attorney, Agent, or Firm* — Osha Liang LLP

(57) ABSTRACT

Focusing on a gamma ray detection phenomenon (event) in which a gamma ray from a gamma ray source is Compton scattered at a first-stage detector, the gamma ray is photo-electrically absorbed at a second-stage detector, the spatial distribution of the gamma ray source is imaged within a predetermined image space on the basis of measurement data for the interaction of the detectors and gamma rays. At this time, a probability parameter ($v_{ij}$) indicating the probability that Compton-scattered gamma ray arrived from within the image space and a detection sensitivity parameter ($s_{ij}$) indicating gamma ray detection sensitivity are set for each event and each pixel on the basis of the measurement data for each event, and these parameters are used to determine the pixel values ($\lambda_j$) for each pixel.

16 Claims, 20 Drawing Sheets

(56) References Cited

U.S. PATENT DOCUMENTS

| | | | | |
|---|---|---|---|---|
| 2005/0139775 A1* | 6/2005 | Gono | ............ | G01T 1/242 |
| | | | | 250/370.09 |
| 2006/0138332 A1* | 6/2006 | Bryman | ............ | G01T 1/249 |
| | | | | 250/363.03 |
| 2010/0019156 A1* | 1/2010 | Kohara | ............ | G01T 1/1642 |
| | | | | 250/363.1 |
| 2015/0323685 A1* | 11/2015 | Nelson | ............ | G01T 1/1611 |
| | | | | 250/370.08 |

OTHER PUBLICATIONS

Wilderman, Scott J. et al.; "List-Mode Maximum Likelihood Reconstruction of Compton Scatter Camera Images in Nuclear Medicine"; IEEE Nucl. Sci.Symp., 3 (1998), pp. 1716-1720 (5 pages).

* cited by examiner

CROSSING PART BETWEEN IMAGE SPACE IS AND ESTIMATED GAMMA RAY ARRIVAL DIRECTION HAVING CONICAL SHAPE

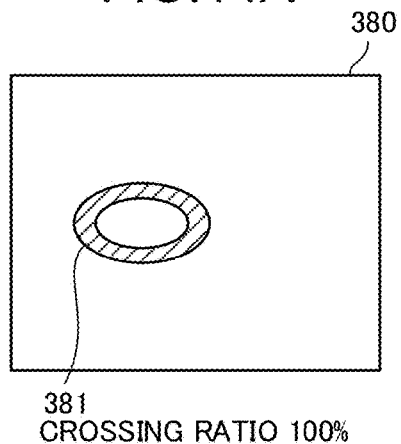
FIG.14A
380
381
CROSSING RATIO 100%
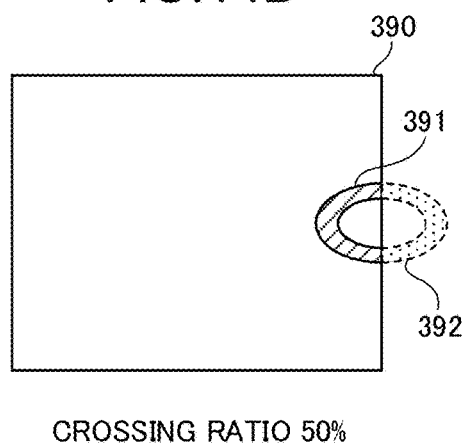
FIG.14B
390
391
392
CROSSING RATIO 50%
FIG.15
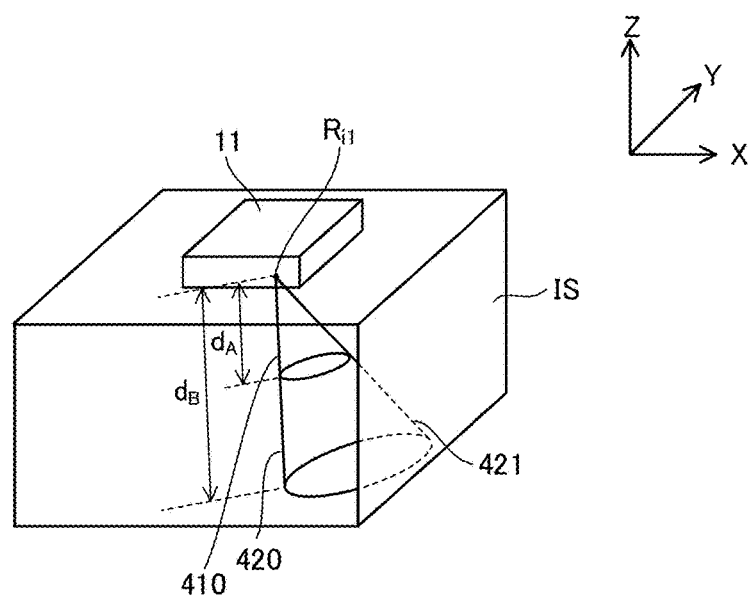

CROSSING RATIO 100%

CROSSING RATIO 50%

FIG.18

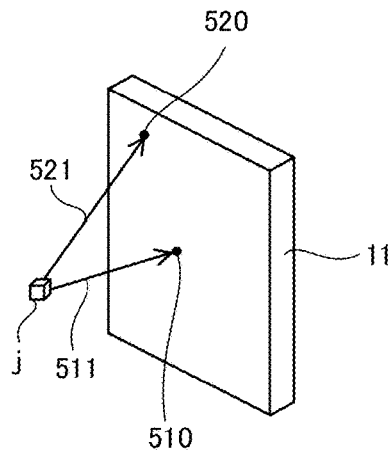

FIG.19A
REFERENCE METHOD

FIG.19B
FIRST IMPROVED METHOD

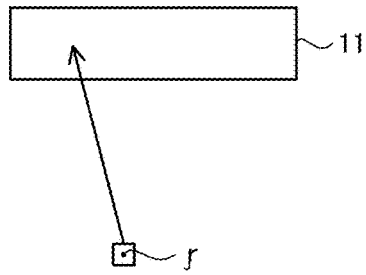

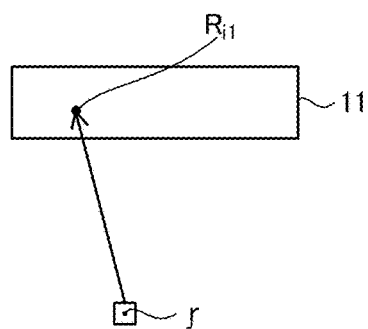

$$\lambda_j^{(l+1)} = \frac{\lambda_j^{(l)}}{s_j} \sum_i \frac{Y_i t_{ij}}{\sum_k t_{ik} \lambda_k^{(l)}}$$

$$\lambda_j^{(l+1)} = \lambda_j^{(l)} \sum_i \frac{v_{ij} t_{ij}}{s_{ij} \sum_k t_{ik} \lambda_k^{(l)}}$$

$$s_{ij} = \exp\left[-\sigma_t(E_0) d_{i,j1}\right] \cdot \left|R_{i1} - r_j\right|^{-2}$$

DETECTION SENSITIVITY ($s_j$)
DEPENDS ONLY ON POSITION ($r_j$)
OF PIXEL j, AND INTERACTION
POSITION ($R_{i1}$) IN DETECTOR
IS NOT CONSIDERED

SET DETECTION SENSITIVITY ($s_{ij}$)
BY TAKING POSITION ($r_j$)
OF PIXEL j AND INTERACTION
POSITION ($R_{i1}$)
INTO CONSIDERATION

FIG.23
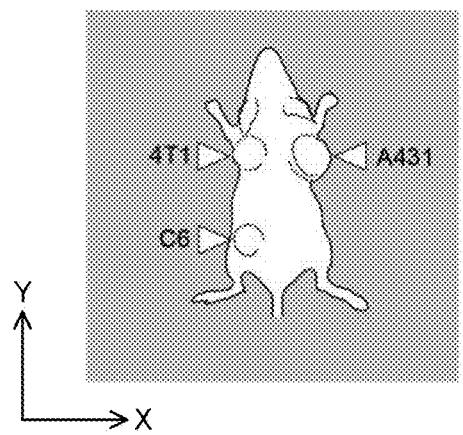
FIG.24
| THREE-DIMENSIONAL DISTRIBUTION IMAGE ACCORDING TO REFERENCE METHOD | THREE-DIMENSIONAL DISTRIBUTION IMAGE ACCORDING TO SECOND IMPROVED METHOD (INTRODUCING $v_{ij}$) | THREE-DIMENSIONAL DISTRIBUTION IMAGE ACCORDING TO FIRST IMPROVED METHOD (INTRODUCING $v_{ij}$ AND $s_{ij}$) |
|---|---|---|
| 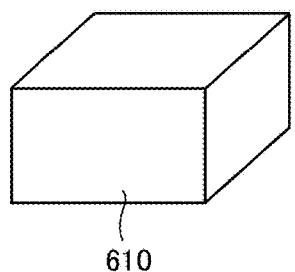 | 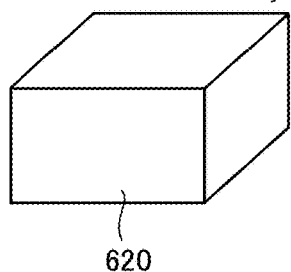 | 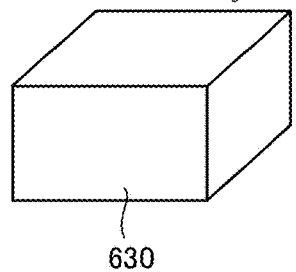 |
| 610 | 620 | 630 | ns
IMAGING DEVICE AND METHOD

TECHNICAL FIELD

The present invention relates to an imaging device and an imaging method.

BACKGROUND ART

As a method for image a spatial distribution of a gamma ray source, there is proposed a method of using a Compton camera (see, for example, Patent Document 1 below). The Compton camera has a wider imaging field of view and a wider detected energy band than positron emission tomography (PET) and single photon emission computed tomography (SPECT), which are existing nuclear medicine technology. The Compton camera enables not only an improvement of the existing technology but also multiple molecular simultaneous imaging for imaging various types of radionuclides at the same time, which was conventionally difficult. This is a technology that enables non-invasive visualization of behaviors of a plurality of radioactive diagnostic pharmaceuticals and biofunctional molecules, so that biological functional information can be obtained at higher level than conventional techniques. Therefore, the Compton camera is expected to contribute to life science research, early diagnosis in clinical medicine, and the like.

A typical Compton camera includes two radiation detectors as a first-stage detector and a second-stage detector, which can measure interaction position and energy. An imaging device using the Compton camera focuses on a gamma ray detection phenomenon in which gamma rays from a gamma ray source are Compton scattered by the first-stage detector and then photoelectrically absorbed by the second-stage detector, and the imaging device images a spatial distribution of the gamma ray source based on interaction information of each detector and gamma rays (namely a detected position and detected energy of gamma rays in each detector).

As a method for imaging the spatial distribution of the gamma ray source, there is proposed an image reconstruction method based on a list-mode maximum-likelihood expectation-maximization (LM-ML-EM) method. This is a method that enables to determine the gamma ray source distribution so that an expected value of likelihood is maximized by iterative calculation even if it is difficult to determine the gamma ray source distribution in the space from measurement data of observed gamma rays by maximum likelihood estimation.

A three-dimensional image indicating the spatial distribution of the gamma ray source is referred to as a distribution image. In a typical image reconstruction method using the LM-ML-EM method, a pixel value $\lambda_j$ of a pixel j in the distribution image is determined in accordance with the following equation (1) (see, for example, Non-Patent Document 1 below). In the LM-ML-EM method, the pixel value is updated by the iterative calculation, so that the estimated distribution of the gamma ray source becomes close to a real distribution. Symbols $\lambda_j^{(l)}$ and $\lambda_j^{(l+1)}$ represent pixel values of the pixel j obtained by the iterative calculation at l-th time and (l+1)th time, respectively. Symbol $s_j$ represents a detection sensitivity parameter for a pixel j and is constituted of a geometrical efficiency of the first-stage detector viewed from the pixel j, and the like. Division by the detection sensitivity parameter $s_j$ means correction of the pixel value by taking the detection sensitivity into consideration. Meanings of other parameters in the equation (1) will be described later in detail.

[Mathematical 1]

$$\lambda_j^{(l+1)} = \frac{\lambda_j^{(l)}}{s_j} \sum_i \frac{Y_i t_{ij}}{\sum_k t_{ik} \lambda_k^{(l)}} \quad (1)$$

PRIOR ART DOCUMENTS

Patent Documents

Patent Document 1: Japanese Patent No. 4486623

Non-Patent Documents

Non-Patent Document 1: S. J. Wilderman, N. H. Clinthorne, J. A. Fessler, and W. L. Rogers, "List-mode maximum likelihood reconstruction of Compton scatter camera images in nuclear medicine", IEEE Nucl. Sci. Symp., 1998, vol. 3, pp. 1716-1720.

DISCLOSURE OF THE INVENTION

Problem to be Solved by the Invention

In the method based on the above equation (1), in a case where "$\Sigma_k t_{ik} \lambda_k$" is very small or other cases, there occurs overfitting in which a corresponding pixel value is updated to a very large value. This causes an artifact (virtual image) in a periphery of the image. It is needless to say that reduction of artifacts is beneficial. Reduction of artifacts contributes to generation of an appropriate distribution image.

In addition, the detection sensitivity is determined depending only on the pixel j in the equation (1). However, because a response function changes largely for each event in the Compton camera, it is considered to be desirable to optimize the detection sensitivity correction for each event. The correction of a pixel value by appropriate detection sensitivity contributes to generation of an appropriate distribution image.

It is an object of the present invention to provide an imaging device and an imaging method that contribute to optimization of a distribution image indicating a spatial distribution of a gamma ray source.

Means for Solving the Problem

An imaging device according to an aspect of the present invention includes a second-stage detector, a first-stage detector disposed between a gamma ray source and the second-stage detector, an event detection unit configured to detect an event in which a gamma ray that is Compton scattered by the first-stage detector is photoelectrically absorbed by the second-stage detector, and an arithmetic unit configured to generate a distribution image indicating a spatial distribution of the gamma ray source as an image in an image space enclosing the gamma ray source, on the basis of measurement data of interaction of each detector and gamma rays in a plurality of events. The arithmetic unit individually sets a probability parameter indicating a probability that Compton-scattered gamma ray arrived from within the image space in each event, for each of a plurality of pixels in the distribution image, on the basis of the measurement data of each event, and the arithmetic unit generates the distribution image using the set probability parameter.

For example, if the gamma ray arrival direction estimated to have a conical shape based on the measurement data in an event crosses the image space in a skimming manner (see FIG. 12), a probability that the gamma ray arrived from within the image space can be said to be relatively small, and hence the measurement data of the event should not be strongly reflected on the distribution image. Further, the above-mentioned crossing state is different for each event. Therefore, it is preferred to set the probability parameter indicating the above-mentioned probability for each event. In this way, artifacts can be reduced. In addition, if the interaction measurement data is used for setting an appropriate probability parameter for each pixel, further reduction of artifacts can be expected, and generation of an appropriate distribution image can be expected.

An imaging device according to another aspect of the present invention includes a second-stage detector, a first-stage detector disposed between a gamma ray source and the second-stage detector, an event detection unit configured to detect an event in a which gamma ray that is Compton scattered by the first-stage detector is photoelectrically absorbed by the second-stage detector, and an arithmetic unit configured to generate a distribution image indicating a spatial distribution of the gamma ray source, on the basis of measurement data of interaction of each detector and gamma rays in a plurality of events. The arithmetic unit individually sets a detection sensitivity parameter indicating a detection sensitivity of Compton scattering in each event for each of a plurality of pixels in the distribution image on the basis of the measurement data of each event, and the arithmetic unit generates the distribution image using the set detection sensitivity parameter.

Because the detection sensitivity parameter for each pixel is set by taking the interaction measurement data in each event into consideration, an appropriate detection sensitivity parameter can be set in accordance with the content of the interaction. As a result, generation of an appropriate distribution image can be expected.

An imaging method according to an aspect of the present invention is a method used by a Compton camera including a second-stage detector, and a first-stage detector disposed between a gamma ray source and the second-stage detector, for generating a distribution image indicting a spatial distribution of the gamma ray source as an image in an image space enclosing the gamma ray source, on the basis of measurement data of interaction of each detector and gamma rays in each event in which a gamma ray that is Compton scattered by the first-stage detector is photoelectrically absorbed by the second-stage detector. The method includes individually setting a probability parameter indicating a probability that Compton-scattered gamma ray arrived from within the image space in each event, for each of a plurality of pixels in the distribution image, on the basis of the measurement data of each event, and generating the distribution image using the set probability parameter.

An imaging method according to another aspect of the present invention is a method used by a Compton camera including a second-stage detector, and a first-stage detector disposed between a gamma ray source and the second-stage detector, for generating a distribution image indicating a spatial distribution of the gamma ray source, on the basis of measurement data of interaction of each detector and gamma rays in each event in a which gamma ray that is Compton scattered by the first-stage detector is photoelectrically absorbed by the second-stage detector. The method includes individually setting a detection sensitivity parameter indicating a detection sensitivity of Compton scattering in each event for each of a plurality of pixels in the distribution image, on the basis of the measurement data of each event, and generating the distribution image using the set detection sensitivity parameter.

Effects of the Invention

According to the present invention, it is possible to provide an imaging device and an imaging method that contribute to optimization of a distribution image indicating a spatial distribution of a gamma ray source.

BRIEF DESCRIPTION OF THE DRAWINGS

FIGS. 14A and 14B are diagrams illustrating examples of states in which Compton conical surface areas of two events cross the image space.

FIG. 15 is a diagram illustrating an example of a state in which a Compton conical surface of one event crosses the image space.

FIG. 18 is a diagram illustrating distances between one pixel and two Compton scattering positions.

FIGS. 19A and 19B are comparison diagrams of a reference method and a first improved method.

FIG. 23 is a schematic plan view of a tumor-bearing mouse used in an experiment.

FIG. 24 is a diagram illustrating three three-dimensional distribution images obtained in the experiment.

BEST MODE FOR CARRYING OUT THE INVENTION

Figure 1A:
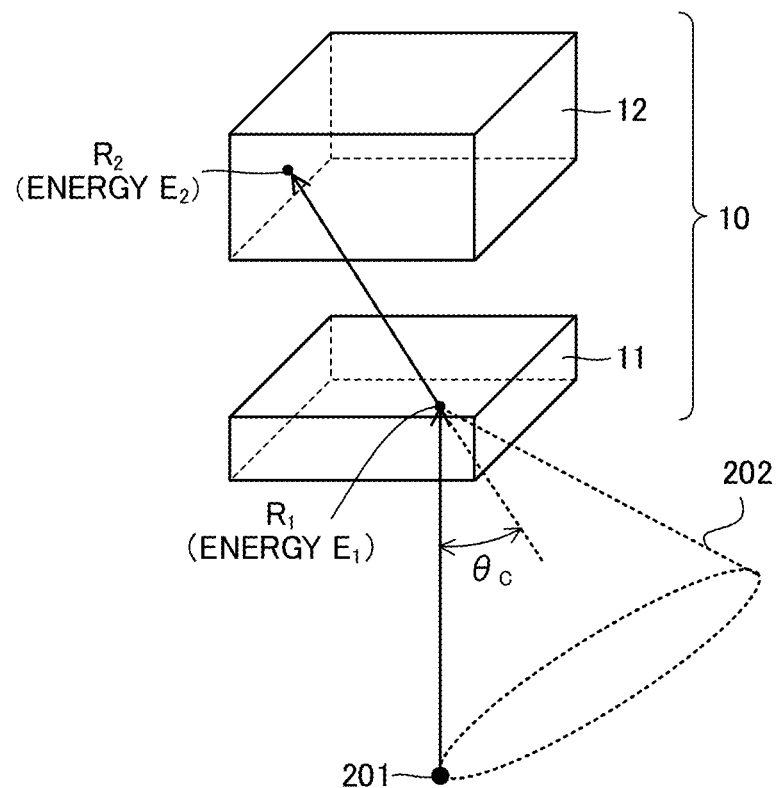
FIGS. 1A and 1B are diagrams for explaining a distribution estimation method of a gamma ray source using Compton scattering.

Hereinafter, examples of an embodiment of the present invention are specifically described with reference to the drawings. In the referred drawings, the same part is denoted by the same reference numeral or symbol, and overlapping description of the same part is omitted as a rule. Note that, in this specification, for simplification of description, names of information, signals, physical quantities, or members corresponding to numerals or symbols may be omitted or abbreviated by indicating the numerals or symbols referred to the information, signal, physical quantity, or members.

[Principle of Distribution Estimation Method of Gamma Ray Source Using Compton Scattering]

Figure 1B:
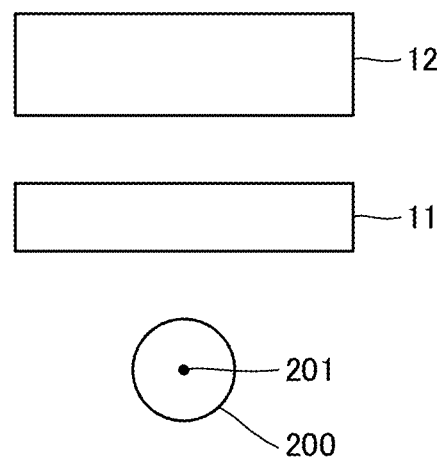

With reference to FIGS. 1A and 1B, there is described a distribution estimation method of a gamma ray source using Compton scattering. In FIGS. 1A and 1B, numerals 11 and 12 respectively denote a first-stage detector and a second-stage detector constituting a Compton camera 10. Each of the detectors 11 and 12 is radiation detector capable of measuring an interaction position and energy and is constituted of a semiconductor, a light emitting substance (scintillator), or the like. Numeral 201 denotes a gamma ray source that emits gamma rays. Numeral 200 denotes an imaging target enclosing the gamma ray source 201. The detectors 11 and 12 are typically disposed in parallel in a state separated from each other. Viewed from the imaging target 200 enclosing the gamma ray source 201, the first-stage detector 11 and the second-stage detector 12 are arranged in this order. In other words, the first-stage detector 11 is disposed between the imaging target 200 enclosing the gamma ray source 201 and the second-stage detector 12. Note that FIG. 1B illustrates only one gamma ray source 201 within the imaging target 200, but multiple gamma ray sources 201 may be scattered within the imaging target 200.

It is supposed that the gamma ray from the gamma ray source 201 enters the first-stage detector 11 and is Compton-scattered at a position $R_1$ in the first-stage detector 11, and the scattered gamma ray enters the second-stage detector 12 and is photoelectrically absorbed at a position $R_2$ in the second-stage detector 12. The Compton scattering and the photoelectric absorption are types of interaction between the gamma ray and the detector. In addition, it is supposed all energy of the gamma ray after the Compton scattering is absorbed at the position $R_2$ in the second-stage detector 12. In this case, energy detected by the detectors 11 and 12 are represented by $E_1$ and $E_2$, respectively. The energy $E_1$ is energy that the gamma ray from the gamma ray source 201 gives electrons at the position $R_1$ by the Compton scattering (namely, energy lost by the Compton scattering out of the energy of the gamma ray from the gamma ray source 201). The energy $E_2$ is all energy of the gamma ray after the Compton scattering and is photoelectric absorption energy at the position $R_2$. Then, according to kinematics of the Compton scattering, the following equation (A1) holds.

[Mathematical 2]

$$\cos\theta_C = 1 + m_e c^2 \left( \frac{1}{E_0} - \frac{1}{E_0 - E_1} \right) \quad (A1)$$

Here, $\theta_C$ is Compton scattering angle, $m_e$ is rest mass of an electron, c is speed of light in vacuum, $E_0$ is initial energy of the gamma ray. The Compton scattering angle $\theta_C$ is an angle between a propagation direction (traveling direction) of the gamma ray before the Compton scattering and a propagation direction (traveling direction) of the gamma ray after the Compton scattering. The initial energy $E_0$ of the gamma ray is an initial energy of the gamma ray radiated from the gamma ray source 201 and may be known to a gamma ray source distribution imaging device 1 described later. If a certain parameter is known to the imaging device 1, it means that the imaging device 1 recognizes the value of the parameter in advance. For example, an antibody labeled with predetermined gamma ray emission nuclei is administered to a living body as the imaging target 200. It is preferred to make the gamma ray source distribution imaging device 1 recognize an energy value of the gamma ray radiated from the gamma ray emission nuclei as the gamma ray source 201 in advance. The gamma ray source 201 may also be positron emission nuclei. In this case, gamma rays due to annihilation of positrons emitted by positron decay from nuclei that are positron emission nuclei become the gamma rays from the gamma ray source 201. Note that even if a type of the administered gamma ray emission nuclei is unknown, and if the initial energy $E_0$ is unknown to the imaging device 1, the imaging device 1 can generate an energy spectrum of the gamma rays during imaging by the Compton camera 10 and can recognize the initial energy $E_0$ of the gamma rays from the energy spectrum.

A conical surface 202 is the surface of a cone that has the vertex at the Compton scattering position $R_1$, a half vertex angle (half of the vertex angle; opening angle) of the Compton scattering angle $\theta_C$, and a center axis on the straight line of the propagation path of the gamma ray after the Compton scattering (namely, the straight line passing through the positions $R_1$ and $R_2$) (hereinafter may be referred to as a Compton conical surface). However, the conical surface 202 is a conical surface that has the vertex at the position $R_1$ and an origin of the half vertex angle in a direction from the position $R_2$ to the position $R_1$ (namely a conical surface that has the vertex at the position $R_1$ and the center axis of a line segment extending from the position $R_1$ in the direction from the position $R_2$ to the position $R_1$). When the Compton scattering position $R_1$ and the Compton scattering angle $\theta_C$ are determined, an arrival direction of the gamma ray directed to the first-stage detector 11 is limited to a generatrix direction of the conical surface 202.

A phenomenon in which a set of "$R_1$, $R_2$, $E_1$ and $E_2$" are detected is referred to as an event. In other words, in one event, a set of "$R_1$, $R_2$, $E_1$ and $E_2$" are detected by the Compton scattering and all energy absorption of the gamma ray after the Compton scattering at one time, and one Compton conical surface is determined from a result thereof. In one event, it is only known that the gamma ray source exists somewhere on the drawn Compton conical surface, but by measuring the Compton scattering phenomenon multiple times, and by drawing the multiple Compton conical surfaces of the multiple times of events on the image space, it is suggested that the gamma ray source exists at the intersection of the multiple Compton conical surfaces.

Figure 2:
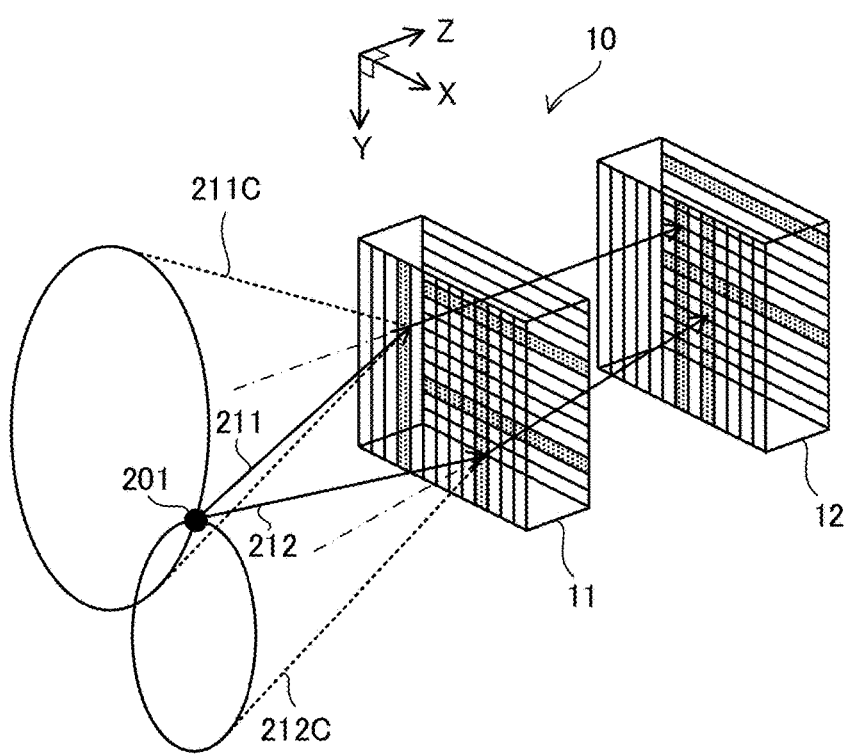
FIG. 2 is a perspective view illustrating a structure of a Compton camera according to an embodiment of the present invention.

FIG. 2 is a perspective view illustrating a structure of the Compton camera 10. In the example illustrated in FIG. 2, a Compton conical surface 211C is set for gamma ray 211 detected in one event, and a Compton conical surface 212C is set for gamma ray 212 detected in another event. Although not illustrated in FIG. 2, a similar Compton conical surface is additionally set every time when the Compton scattering phenomenon is detected. A position at which more Compton conical surfaces are overlapped corresponds to a position at which many gamma rays are generated. Therefore, for example, a distribution manner of the gamma ray source can be imaged by setting the pixel value of each pixel in the image space to a value corresponding to multiplicity of overlapping of Compton conical surfaces.

Each of the detectors 11 and 12 is a radiation detector that can measure interaction position of itself and the gamma ray, and energy of the gamma ray. In the following description, a structure in which each of the detectors 11 and 12 is constituted of a semiconductor flat plate (planar type detector) made of high-purity germanium is mainly exemplified, so as to describe structures and operations of the detectors 11 and 12. Here, one surface and the other surface of the semiconductor flat plate are referred to as a front surface and a rear surface, respectively. The normal directions of the front surface and the rear surface are identical to the thickness direction of the semiconductor flat plate. In each of the detectors 11 and 12, the front surface is positioned closer to the imaging target 200 enclosing the gamma ray source 201 than the rear surface. The front surface and the rear surface of the first-stage detector 11 indicate the front surface and the rear surface of the semiconductor flat plate constituting the first-stage detector 11. The front surface and the rear surface of the second-stage detector 12 indicate the front surface and the rear surface of the semiconductor flat plate constituting the second-stage detector 12.

In the semiconductor flat plate, each of the front surface and the rear surface is provided with a plurality of strip electrodes arranged in a stripe shape. To provide a clear and specific description, X-axis, Y-axis, and Z-axis orthogonal with each other are defined. In each of the first-stage detector 11 and the second-stage detector 12, a plurality of strip electrodes extending in the Y-axis direction are arranged in the X-axis direction on the front surface, while a plurality of strip electrodes extending in the X-axis direction are arranged in the Y-axis direction on the rear surface. In the plurality of strip electrodes arranged on each surface of the first-stage detector 11, neighboring strip electrodes are electrically insulated from each other with spacing. The same is true for the second-stage detector 12.

In each of the detectors 11 and 12, the top layer on the front surface side of the semiconductor flat plate is an $n^+$ layer, while the top layer on the rear surface side is a $p^+$ layer, and the area sandwiched between the $n^+$ layer and the $p^+$ layer is made of high-purity p-type semiconductor, for example. If each detector is a detector using germanium, each detector is cooled to the liquid nitrogen temperature (−196 degrees C.) for example. Therefore, in each semiconductor flat plate of the detectors 11 and 12, supply of conduction carriers by thermal excitation of electrons from a valence band is suppressed. Note that the detectors 11 and 12 may be constituted of a semiconductor that does not need to be cooled during measurement.

In each of the detectors 11 and 12, as to the strip electrodes on both surfaces, a reverse bias voltage is applied between the surfaces so that an electric field is generated in the thickness direction of the semiconductor flat plate. In this case, in the semiconductor, there is formed an area called a depletion layer in which supply of conduction carriers from an impurity level is suppressed, and thus the semiconductor becomes a high impedance state. When a gamma ray enters the depletion layer, an interaction occurs between the gamma ray and electrons in the semiconductor, and the electrons receive energy from the gamma ray. Further, multiple carrier charges are generated due to excitation of the electrons from the valence band along a path of the electrons that received energy, and the generated carrier charges are extracted by the reverse bias voltage. Here, current due to the carrier charge has a current value on which the energy of the electrons that interacted with the gamma ray is reflected, and a charge amount that is the integral of the current is proportional to the energy. Therefore, if the Compton scattering occurs as the above-mentioned interaction in the detector 11, a current corresponding to the energy $E_1$ that the gamma ray lost by the Compton scattering is detected by the detector 11. The energy $E_1$ is specified by the charge amount corresponding to the integral of the current detected by the detector 11. If all energy of the gamma ray after the Compton scattering is absorbed by the detector 12, a photoelectric effect occurs as the above-mentioned interaction, the current corresponding to the all energy of the gamma ray after the Compton scattering is detected by the detector 12. The energy $E_2$ is specified by the charge amount corresponding to the integral of the current detected by the detector 12.

In each detector, a combination of the strip electrode on the front surface side and the strip electrode on the rear surface side is specified, in which the current signal due to the interaction between the gamma ray and the detector is strongly detected. Thus, the interaction position is detected. In each event, the interaction position detected by the first-stage detector 11 is the Compton scattering position $R_1$, and the interaction position detected by the second-stage detector 12 is the photoelectric absorption position $R_2$.

For example, in the detector 11, if the current signal is detected from an $x_A$-th strip electrode on the front surface and if the current signal is detected from a $y_A$-th strip electrode on the rear surface, it can be detected that the interaction with the gamma ray occurred in a block $(x_A, y_A)$ in the detector 11 (the same is true for the detector 12). In the X-axis direction, a position of the block $(x_A, y_A)$ is the same as a position of the $x_A$-th strip electrode on the front surface. In the Y-axis direction, a position of the block $(x_A, y_A)$ is the same as a position of the $y_A$-th strip electrode on the rear surface. Symbol $x_A$ represents an arbitrary natural number equal to or less than the number of strip electrodes disposed on the front surface. Symbol $y_A$ represents an arbitrary natural number equal to or less than the number of strip electrodes disposed on the rear surface.

The number of strip electrodes disposed on each surface of the first-stage detector 11 is arbitrary (the same is true for the second-stage detector 12). In each detector, a detection resolution of the interaction position in the X-axis direction depends on the number of strip electrodes disposed on the front surface, and a detection resolution of the interaction position in the Y-axis direction depends on the number of strip electrodes disposed on the rear surface.

A Z-axis component of the interaction position detected by each detector may be constant (the center position in the Z-axis direction of each detector). However, in each of the detectors 11 and 12, it is possible to configure to derive the interaction position in the Z-axis direction (the Z-axis component of the interaction position) with high accuracy, on the basis of a time difference between the current signal from the strip electrode on the front surface and the current signal from the strip electrode on the rear surface.

Note that the semiconductor forming the detectors 11 and 12 may also be a semiconductor other than germanium as long as it expresses a sensitivity to the gamma rays. For example, as the semiconductor forming the detectors 11 and 12, silicon, cadmium telluride, cadmium zinc telluride, or diamond may also be used. Although the case where the detectors 11 and 12 are made of semiconductor is described above, each of the detectors 11 and 12 may have any structure as long as being a radiation detector that can measure an interaction position between itself and gamma rays and energy of the gamma rays. For example, it is possible to use a scintillation detector, a time projection chamber (TPC) using gas or liquid, or the like, so as to constitute each of the detectors 11 and 12.

[Overall Structure and Basic Operation of Gamma Ray Source Distribution Imaging Device]

Figure 3:
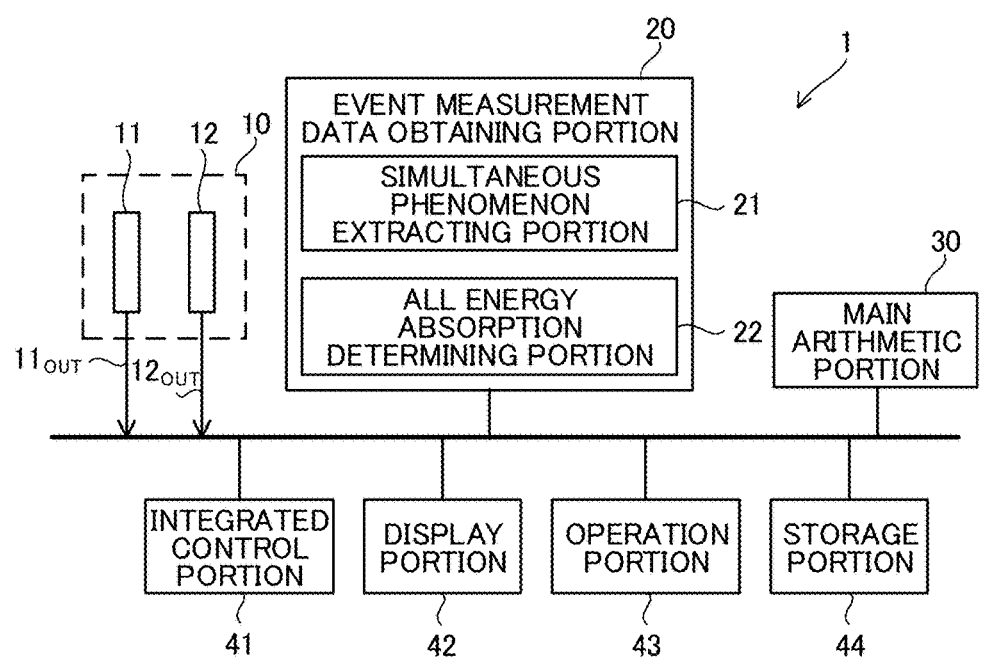
FIG. 3 is a schematic overall structural diagram of a gamma ray source distribution imaging device according to the embodiment of the present invention.

FIG. 3 is a schematic overall structural diagram of the gamma ray source distribution imaging device 1 according to this embodiment. The imaging device 1 includes the Compton camera 10 and members denoted by numerals 20, 30, and 41 to 44. However, it is also possible to consider that the Compton camera 10 is not included as a structural element of the imaging device 1.

When an interaction between the first-stage detector 11 and the gamma ray occurs in the first-stage detector 11, the first-stage detector 11 outputs a signal $11_{OUT}$ corresponding to the content of the interaction. When an interaction between the second-stage detector 12 and the gamma ray occurs in the second-stage detector 12, the second-stage detector 12 outputs a signal $12_{OUT}$ corresponding to the content of the interaction. The signal $11_{OUT}$ enables to specify the interaction position in the detector 11 with the gamma ray (for example the position $R_1$) and the interaction energy given from the gamma ray to the detector 11 due to the interaction in the detector 11 (for example the energy $E_1$). The signal $12_{OUT}$ enables to specify the interaction position in the detector 12 with the gamma ray (for example the position $R_2$) and the interaction energy given from the gamma ray to the detector 12 due to the interaction in the detector 12 (for example the energy $E_2$).

An event measurement data obtaining portion 20 includes a simultaneous phenomenon extracting portion 21 and an all energy absorption determining portion 22, and uses them to generate and obtain event measurement data that is interaction data between the gamma ray and the detectors 11 and 12 in each event.

Figure 4:
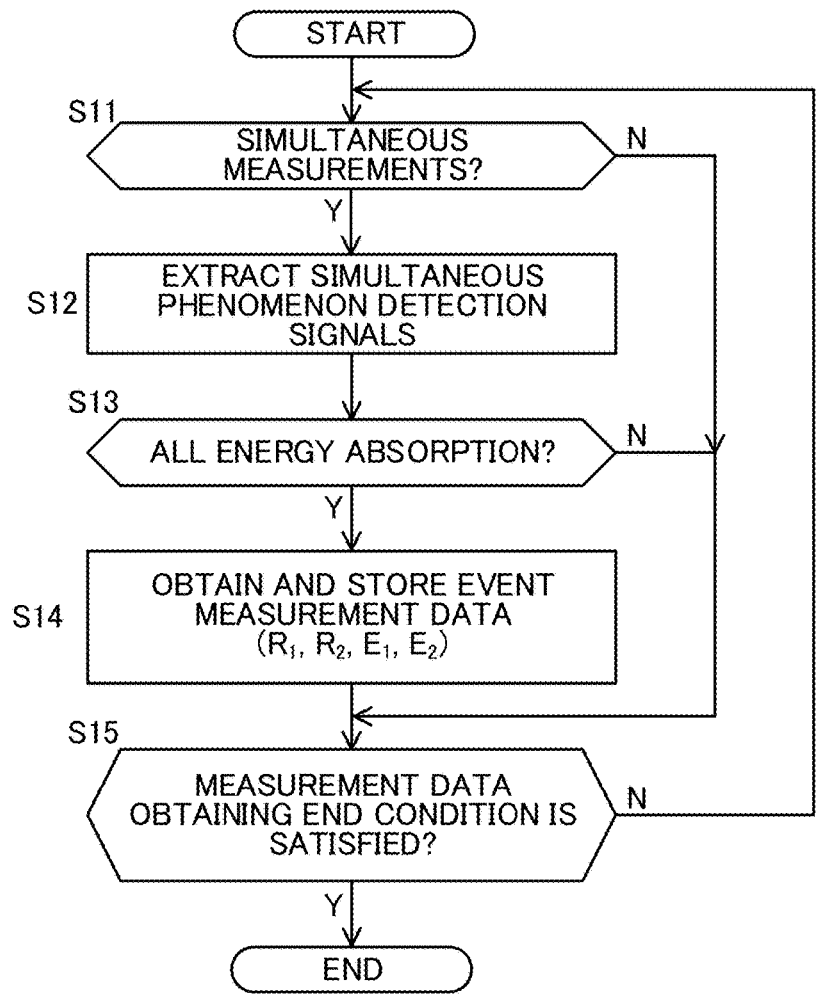
FIG. 4 is a flowchart of an operation of obtaining event measurement data according to the embodiment of the present invention.

FIG. 4 is a flowchart for obtaining event measurement data by the obtaining portion 20. In Steps S11 and S12, the simultaneous phenomenon extracting portion 21 extracts simultaneous phenomenon detection signals, which are a set of output signals corresponding to phenomena simultaneously occurred in the detectors 11 and 12 in the output signal $11_{OUT}$ of the first-stage detector 11 and the output signal $12_{OUT}$ of the second-stage detector 12.

For example, every time when the first-stage detector 11 outputs the signal $11_{OUT}$, the simultaneous phenomenon extracting portion 21 assigns a time stamp indicating the output time to the signal $11_{OUT}$ and stores the signal $11_{OUT}$ in the storage portion 44. In addition, every time when the second-stage detector 12 outputs the signal $12_{OUT}$, the simultaneous phenomenon extracting portion 21 assigns a time stamp indicating the output time to the signal $12_{OUT}$ and stores the signal $12_{OUT}$ in the storage portion 44. Then, at an arbitrary timing, the simultaneous phenomenon extracting portion 21 reads an arbitrary signal $11_{OUT}$ stored in the storage portion 44 and searches the storage portion 44 for the signal $12_{OUT}$ having a time difference between itself and the read signal $11_{OUT}$ that is a predetermined allowable time difference or less (Step S11). If there is the signal $12_{OUT}$ having a time difference between itself and the read signal $11_{OUT}$ that is a predetermined allowable time difference or less in the storage portion 44 (Y in Step S11), the read signal $11_{OUT}$ and the retrieved signal $12_{OUT}$ are extracted as the simultaneous phenomenon detection signals (Step S12).

If the signal $12_{OUT}$ having a time difference between itself and the read signal $11_{OUT}$ that is a predetermined allowable time difference or less does not exist in the storage portion 44 (N in Step S11), the process proceeds to Step S15. Note that the second signal having a time difference between itself and the first signal that is a predetermined allowable time difference or less means the second signal associated with a time stamp indicating time point having a time difference between itself and time point indicated by a time stamp corresponding to the first signal is a predetermined allowable time difference or less.

Note that the simultaneous phenomenon extracting portion 21 may extract the simultaneous phenomenon detection signals from the output signals $11_{OUT}$ and $12_{OUT}$ of the detectors 11 and 12 in real time without using storage of the signals $11_{OUT}$ and $12_{OUT}$ in the storage portion 44.

After extracting the simultaneous phenomenon detection signals in Step S12, the process proceeds to Step S13. In Step S13, the all energy absorption determining portion 22 performs an all energy absorption determination process on the extracted simultaneous phenomenon detection signals. In the all energy absorption determination process, it is determined whether or not the signal $12_{OUT}$ in the simultaneous phenomenon detection signals indicates all energy absorption. In other words, specifically, the all energy absorption determining portion 22 determines whether or not the simultaneous phenomenon determination expression "$E_0-\Delta E_0 \leq E_1+E_2 \leq E_0+\Delta E_0$" holds for the interaction energy $E_1$ and $E_2$ indicated by the signals $11_{OUT}$ and $12_{OUT}$ in the simultaneous phenomenon detection signals. If the simultaneous phenomenon determination expression holds (Y in Step S13), it is determined that the signal $12_{OUT}$ in the simultaneous phenomenon detection signals indicates all energy absorption, and the process proceeds to Step S14. Taking error in energy detection into consideration, $\Delta E_0$ is introduced in the simultaneous phenomenon determination expression. $\Delta E_0$ has a positive predetermined value. For example, if $E_0$ is 511 kiloelectronvolts (keV), $\Delta E_0$ is 5 keV.

If the simultaneous phenomenon determination expression does not hold, the all energy absorption determining portion 22 determines that the signal $12_{OUT}$ in the simultaneous phenomenon detection signals does not indicate all energy absorption (N in Step S13), the simultaneous phenomenon detection signals are abandoned, and the process proceeds to Step S15. It is because that the Compton scattering angle cannot be correctly estimated from the measurement data if the simultaneous phenomenon determination expression does not hold, even if the Compton scattering is generated.

In Step S14, the event measurement data obtaining portion 20 recognizes that the extracted simultaneous phenomenon detection signals indicate detection signals in an effective event, so as to obtain the event measurement data (interaction measurement data) based on the signals $11_{OUT}$ and $12_{OUT}$ in the effective event, and it stores the obtained event measurement data in the storage portion 44. After Step S14, the process proceeds to Step S15. One event measurement data includes information for specifying the interaction positions $R_1$ and $R_2$ and the energy $E_1$ and $E_2$ in one event.

Therefore, if a certain gamma ray is Compton-scattered by the detector 11, and if energy of the Compton scattered gamma ray is all absorbed by the detector 12, the signal $11_{OUT}$ including information for specifying the interaction position $R_1$ and the detected energy $E_1$ in the detector 11, and the signal $12_{OUT}$ including information for specifying the interaction position $R_2$ and the detected energy $E_2$ in the detector 12 are extracted as the simultaneous phenomenon detection signals. Then, one event measurement data is generated and obtained from the extracted simultaneous phenomenon detection signals. In other words, the obtaining portion 20 detects the event using the extracting portion 21 and the determining portion 22 and extracts the event measurement data from the output signals $11_{OUT}$ and $12_{OUT}$ of the detectors 11 and 12.

In Step S15, the event measurement data obtaining portion 20 determines whether or not a predetermined measurement data obtaining end condition is satisfied. If the measurement data obtaining end condition is satisfied, the event measurement data obtaining process is finished. If the measurement data obtaining end condition is not satisfied, the process returns to Step S11. For example, when the number of obtained event measurement data reaches a predetermined number (for example a few tens of thousands), the measurement data obtaining end condition is satisfied. Otherwise, for example, when the process of extracting the simultaneous phenomenon detection signals is finished for all signal $11_{OUT}$ stored in the storage portion 44, the measurement data obtaining end condition is satisfied.

With reference to FIG. 3 again, the main arithmetic portion 30 is constituted of a central processing unit (CPU) and a highly parallel arithmetic accelerator such as a single instruction multiple data (SIMD) arithmetic unit, and the like. The main arithmetic portion 30 sets a predetermined image space in the space enclosing the imaging target 200, and it generates a distribution image indicating density distribution of the gamma ray source (gamma ray source distribution image) as an image in the image space, on the basis of the event measurement data generated for a plurality of events. A method for generating the distribution image will be described later. A dedicated arithmetic unit for generating a reconstructed image including the distribution image may be used to constitute the main arithmetic portion 30. The dedicated arithmetic unit is a device having an optimal hardware structure for image reconstruction, which is configured using, for example, an application specific integrated circuit (ASIC), a field-programmable gate array (FPGA), and the like.

An integrated control portion 41 is realized using a central processing unit (CPU) or the like so as to integrally control operations of the individual portions of the imaging device 1. A display portion 42 is constituted of a liquid crystal display panel or the like so as to display arbitrary images including the distribution image under control by the integrated control portion 41. An operation portion 43 is constituted of a pointing device, a keyboard, and the like, so as to receive arbitrary instructions and operations from a user of the imaging device 1. The storage portion 44 is constituted of a read only memory (ROM) and a random access memory (RAM), so as to store programs executed by the main arithmetic portion 30, the integrated control portion 41, and the like, and also store arbitrary data. The storage portion 44 may include a secondary storage device such as a hard disk drive (HDD) or a flash memory.

Figure 5:
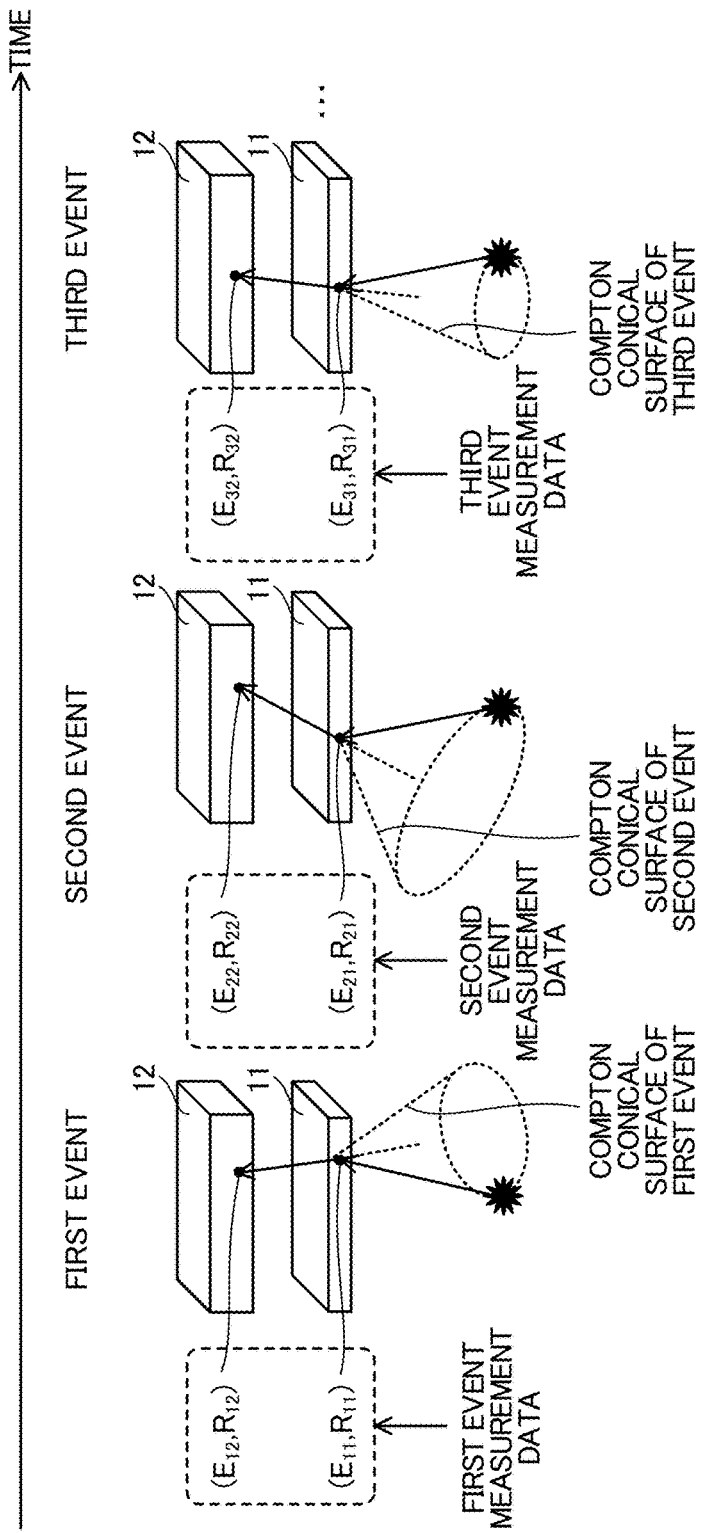
FIG. 5 is a diagram illustrating a manner in which measurement data of a plurality of events are obtained.

FIG. 5 illustrates a manner in which event measurement data in a plurality of events are sequentially obtained. The event measurement data in the i-th event (namely, an event of the i-th time) is also referred to as a measurement data of the i-th event. Symbol i is an arbitrary natural number. The detected energy $E_1$ and $E_2$ in the detectors 11 and 12 in the measurement data of the i-th event are particularly represented by $E_{i1}$ and $E_{i2}$, respectively. The interaction position in the detector 11 in the measurement data of the i-th event (namely, the detected Compton scattering position) $R_1$ and the interaction position in the detector 12 (namely, the detected photoelectric absorption position) $R_2$ are particularly represented by $R_{i1}$ and $R_{i2}$, respectively.

The main arithmetic portion 30 can derive and set the Compton scattering angle $\theta_C$ and the Compton conical surface for each event using the above equation (A1), on the basis of the event measurement data ($E_{i1}$, $R_{i1}$, $E_{i2}$, $R_{i2}$) in the event.

Figure 6:
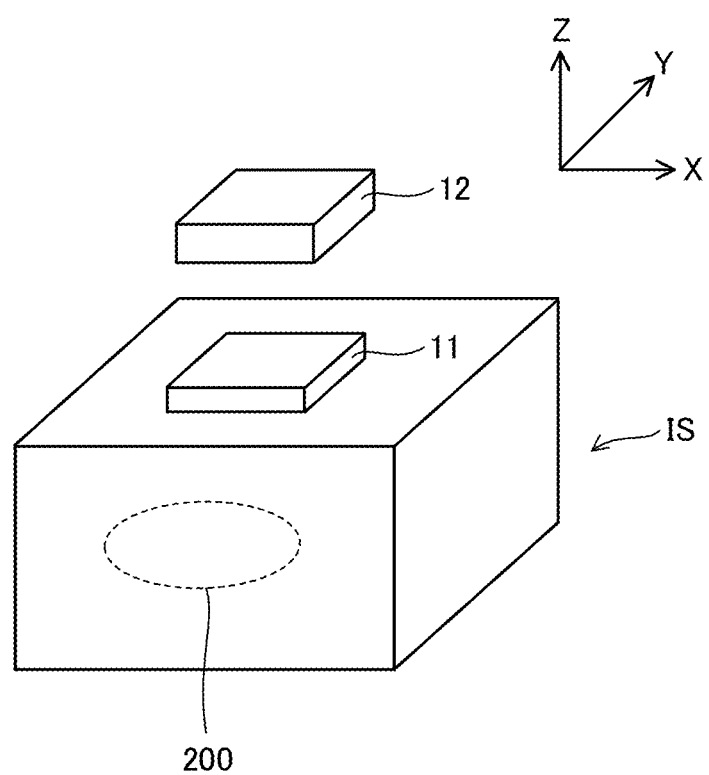
FIG. 6 is a relationship diagram between each detector and an image space.

FIG. 6 illustrates an image space IS set and defined by the main arithmetic portion 30. Note that the image space IS may be set in a dedicated memory device that can be included in the storage portion 44. The image space IS is a three-dimensional imaginary space set in association with the real space and encloses at least a position of the imaging target 200. Naturally, the image space IS has a limited size. A shape of the image space IS may be arbitrary shape, but here it is supposed that the image space IS is a cuboid space having two surfaces each parallel to an XY plane, a YZ plane, and a ZX plane. The XY plane is a plane parallel to the X-axis and the Y-axis, the YZ plane is a plane parallel to the Y-axis and the Z-axis, and the ZX plane is a plane parallel to the Z-axis and the X-axis. Typically, for example, one of surfaces parallel to the XY plane of the image space IS is disposed adjacent to the front surface of the detector 11, and then the center of the detector 11, the center of the detector 12, and the center of the image space IS are aligned on a straight line.

Figure 7A:
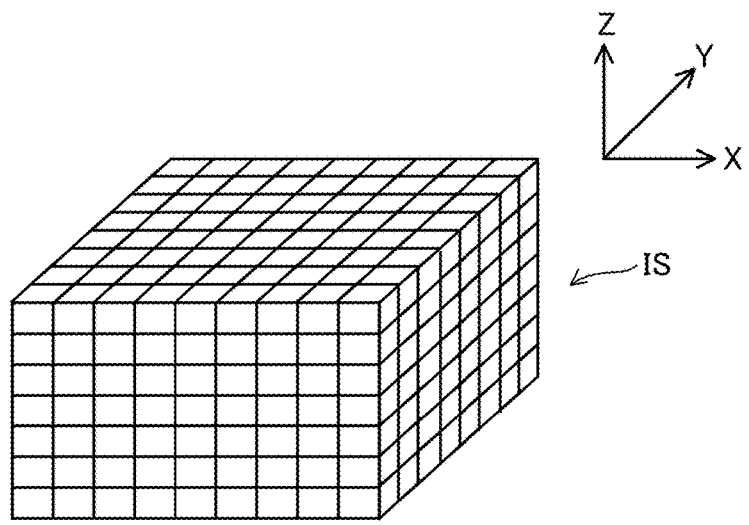
FIGS. 7A and 7B are diagram illustrating a manner in which the image space is divided in three directions, and pixels forming the image space.
Figure 7B:
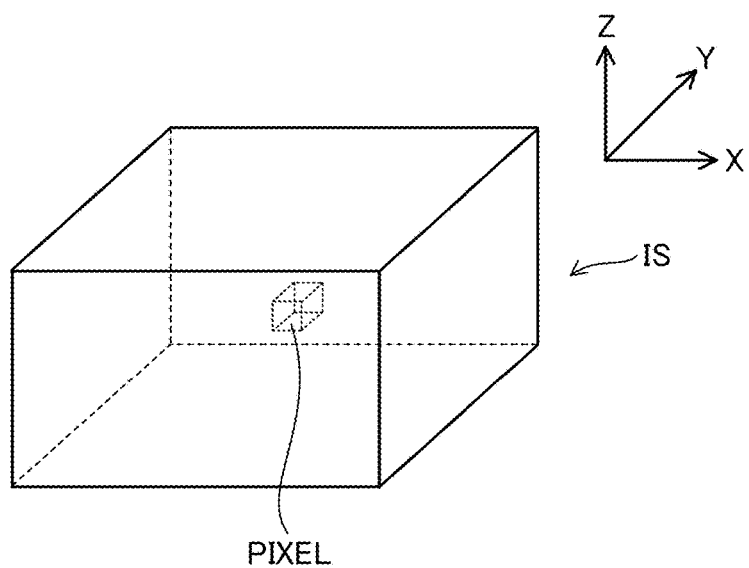
Figure 8:
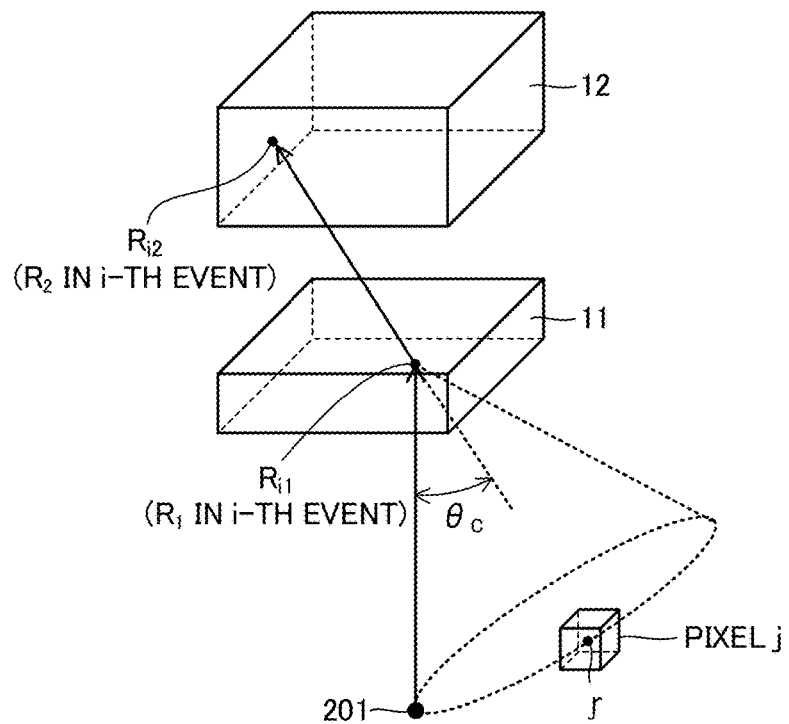
FIG. 8 is a diagram illustrating positions, an angle, a conical surface, and the like, which are related to Compton scattering.

The main arithmetic portion 30 can generate the distribution image indicating a density distribution state of the gamma ray source as a three-dimensional image in the image space IS. FIG. 7A illustrates a manner in which the image space IS is equally divided into a plurality of areas in each of the X-axis, Y-axis and Z-axis directions. The image space IS is constituted of a plurality of element areas equally divided in each of the X-axis, Y-axis and Z-axis directions, and each element area functions as an pixel of the distribution image (see FIG. 7B). Each pixel forming the distribution image is a three-dimensional pixel having dimensions in X-axis, Y-axis and Z-axis directions and can be called a voxel. Here, it is supposed that each pixel forming the distribution image has a cubic shape. Among pixels forming the distribution image, a certain noted pixel is expressed as a pixel j or a pixel k using an arbitrary integer j or k indicating a pixel number. In addition, a position of the pixel j is expressed by a symbol $r_j$ (see FIG. 8). FIG. 8 illustrates a relationship among the Compton conical surface, the pixel j, the Compton scattering position $R_{i1}$, and the like in the i-th event. The position $r_j$ of the pixel j indicates a center position of the pixel j (center coordinates of the pixel j in the image space IS). In the following description, unless otherwise noted, the pixel means a pixel in the image space IS (namely a pixel in the distribution image).

<<Reference Method for Generating Distribution Image>>

The main arithmetic portion 30 can generate the distribution image of the gamma ray source using the image reconstruction method based on the list-mode maximum-likelihood expectation-maximization (LM-ML-EM) method. This is a method of estimating the gamma ray source distribution in the space so that a probability that the measurement data of the observed gamma rays is obtained becomes highest in a statistical manner.

The reference method for generating the distribution image using the LM-ML-EM method is described. In the reference method, the distribution image is reconstructed based on the following equation (B1).

[Mathematical 3]

$$\lambda_j^{(l+1)} = \frac{\lambda_j^{(l)}}{s_j} \sum_i \frac{Y_i t_{ij}}{\sum_k t_{ik} \lambda_k^{(l)}} \quad (B1)$$

Symbol $\lambda_j$ expressed as $\lambda_j^{(l)}$ or $\lambda_j^{(l+1)}$ represents a pixel value of the pixel j in the distribution image (the j-th pixel in the distribution image). A pixel value of the pixel j indicates an expected value of the number of radionuclides decayed at the pixel j in an imaging time of the Compton camera 10. Because a number of decay of radionuclides per unit time follows a Poisson distribution, $\lambda_j$ is an expected value of this Poisson distribution. The radionuclide in this case is a gamma ray emission nucleus or a positron emission nucleus as the gamma ray source 201. In the LM-ML-EM method, the pixel value is updated by iterative calculation, so that the gamma ray source distribution becomes close to an estimated true distribution. Symbol $\lambda_j^{(l)}$ represents a pixel value of the pixel j (the above-mentioned expected value for the pixel j) obtained by the l-th iterative calculation, and $\lambda_j^{(l+1)}$ represents a pixel value for the pixel j (the above-mentioned expected value for the pixel j) obtained by the (l+1)th iterative calculation. Therefore symbol "l" accompanying $\lambda_j$ represents the number of iterative calculation (namely, an integer).

Symbol $t_{ij}$ is called a system response function and represents a probability that the gamma ray emitted from the pixel j is measured as the i-th event. The system response function $t_{ij}$ is set for the pixel that crosses the Compton conical surface estimated from the event measurement data. Symbol $Y_i$ represents the number of gamma rays detected by the Compton camera 10 in the i-th event. Here, because a phenomenon of detecting one gamma ray is regarded as one event, "$Y_i=1$" holds.

Product $t_{ij}\lambda_j$ represents an expected value with which the i-th event is measured by the gamma ray emitted from the pixel j having an accumulation amount of radionuclides corresponds to the pixel value $\lambda_j$. Therefore, as to the i-th event, the sum of "$t_{ij}\lambda_j$" for all pixels ideally corresponds to "$Y_i=1$" that is the number of actually detected gamma rays. Therefore, in the sum calculation of "i" in the right side of the equation (B1), calculated is a ratio of the number of detected gamma rays by measurement (corresponding to "$Y_i$" of the numerator) to the number of detected gamma rays obtained by calculation (corresponding to "$\Sigma_k t_{ik} \lambda_k$" of the denominator). The update of the pixel value by the iterative calculation is performed based on this ratio. The pixel value is updated in the iterative calculation so that the number of detected gamma rays (denominator) by calculation becomes close to the number of detected gamma rays (numerator) by measurement. In other words, for example, if the number of detected gamma rays by calculation is larger than the number of detected gamma rays by measurement, the pixel value is updated so that the number of detected gamma rays by calculation becomes smaller than that before the update. If the number of detected gamma rays by calculation is smaller than the number of detected gamma rays by measurement, the pixel value is updated so that the number of detected gamma rays by calculation becomes larger than that before the update.

Symbol $s_j$ is a detection sensitivity parameter for the pixel j, and division by $s_j$ means correction of the pixel value by taking the detection sensitivity into consideration. The detection sensitivity parameter $s_j$ is mainly constituted of factors such as a geometrical efficiency of the detector 11 viewed from the pixel j, an interaction probability of the gamma ray and the detectors 11 and 12, an attenuation of the gamma ray from being emitted until being detected, and the like. The detection sensitivity parameter $s_j$ can be set by numerical operation using these factors, and it is also possible to obtain the detection sensitivity parameter $s_j$ by Monte Carlo simulation.

The geometrical efficiency of the detector 11 viewed from the pixel j indicates a size (solid angle) of the detector 11 viewed from the pixel j. The probability that the gamma ray emitted from the pixel j hits the detector 11 depends on the geometrical efficiency of the detector 11 viewed from the pixel j. As a distance between the pixel j and the detector 11 is smaller, the size of the detector 11 viewed from the pixel j becomes larger, so that the probability that the gamma ray emitted from the pixel j hits the detector 11 is increased. If the distance between the pixel j and the detector 11 is correspondingly large, the geometrical efficiency of the detector 11 viewed from the pixel j is substantially proportional to the inverse square of the distance between the pixel j and the detector 11.

Meaning of the sum ($\Sigma$) in the equation (B1) is supplementarily described below. The expression (B1a) and the expression (B1b) are extracted parts of the equation (B1). In the expression (B1a), i and k represent an event number and a pixel number, respectively. The expression (B1a) expresses the sum of "$t_{ik}\lambda_k^{(l)}$" for all pixels in the i-th event. In the numerator of the expression (B1b), i and j represent the event number and the pixel number, respectively. The expression (B1b) indicates the sum of fractions having a denominator of the expression (B1a) and a numerator of "$Y_i t_{ij}$" for all events. The all events means all the events used for determining the pixel value of each pixel of the distribution image.

[Mathematical 4]

$$\sum_k t_{ik} \lambda_k^{(l)} \tag{B1a}$$

$$\sum_i \frac{Y_i t_{ij}}{\sum_k t_{ik} \lambda_k^{(l)}} \tag{B1b}$$

[Scattering Angle Uncertainty]

In each event, the arrival direction of the gamma ray toward the first-stage detector 11 is limited to the generatrix direction of the Compton conical surface. However, the Compton scattering angle is determined by energy in the Compton scattering and hence has uncertainty due to a physical phenomenon in gamma ray detection. The distribution function of the Compton scattering angle indicating this uncertainty (distribution function of an error distribution of the Compton scattering angle) is referred to as a scattering angle distribution function. The Compton conical surface also has uncertainty according to the scattering angle distribution function, and it is estimated that the gamma ray source probabilistically exists in a range derived from the scattering angle distribution function.

Figure 9:
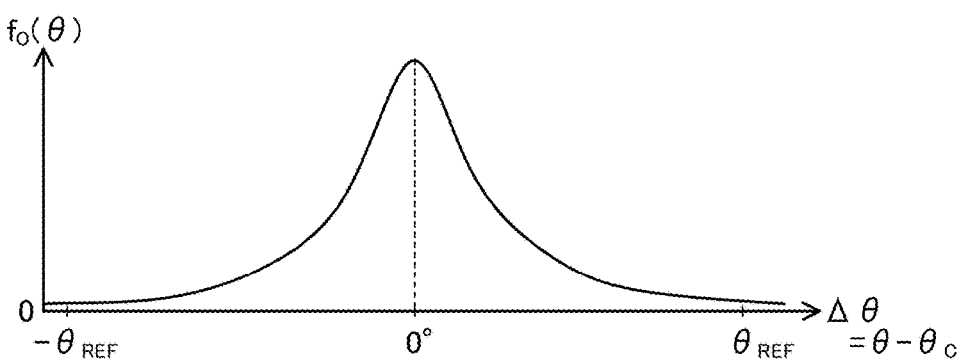
FIG. 9 is a diagram illustrating a scattering angle distribution function due to uncertainty of a Compton scattering angle.

In this embodiment, the function $f_O(\theta)$ expressed by the following equation (C1) is defined as the scattering angle distribution function. FIG. 9 illustrates a graph of the scattering angle distribution function $f_O(\theta)$.

[Mathematical 5]

$$f_O(\theta) = \frac{1}{Z\sqrt{2\pi}} \sum_l \frac{n_l}{\sqrt{\sigma_e^2 + \sigma_{d,l}^2}} \exp\left\{-\frac{(\theta - \theta_C)^2}{2(\sigma_e^2 + \sigma_{d,l}^2)}\right\} \tag{C1}$$

In the equation (C1), Z represents an atomic number of a semiconductor substance that constitutes the detectors 11 and 12 so as to generate an interaction with the gamma rays (hereinafter referred to as a detector substance), and $n_l$ represents the number of electrons in the l-th electron shell of the detector substance. The sum symbol "$\Sigma$" in the equation (C1) represents the sum for all electron shells in the detector substance. Symbol $\sigma_e$ represents a standard deviation determined from an energy detection resolution when the detector 11 detects the energy $E_1$. Symbol $\sigma_{d,l}$ represents a standard deviation of the detected energy due to Doppler broadening due to electron momentum of the l-th electron shell in the detector substance. Among parameters on the right side of the equation (C1), parameters other than $\theta_C$, $\theta$, $\sigma_e$ and $\sigma_{d,l}$ have predetermined values known to the imaging device 1.

Figure 10:
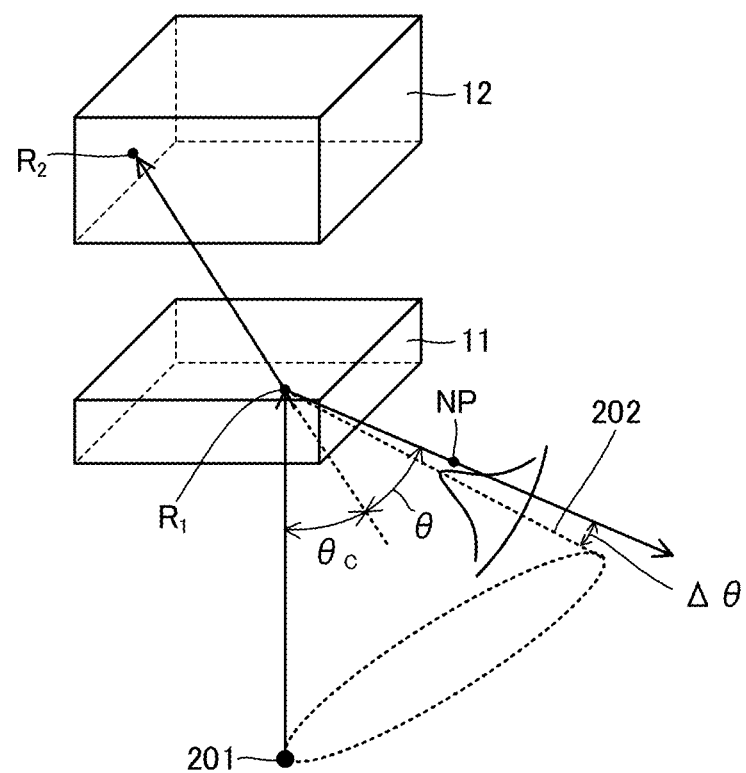
FIG. 10 is a diagram for explaining the uncertainty of the Compton scattering angle.

With reference to FIG. 10, $\theta_C$ represents the Compton scattering angle determined by the above equation (A1). Symbol $\theta$ represents the Compton scattering angle when supposing that the gamma ray emitted from a noted position NP is Compton-scattered at the interaction position $R_1$ in the detector 11. In other words, an angle between the straight line connecting the interaction positions $R_1$ and $R_2$ of the detectors 11 and 12 (the center axis of the Compton conical surface) and the straight line connecting the noted position NP and the position $R_1$ corresponds to the angle $\theta$. The angle ($\theta - \theta_C$) indicates an error angle $\Delta\theta$ between the Compton scattering angle $\theta$ when the gamma rays emitted from the noted position NP is Compton-scattered at the interaction position $R_1$ in the detector 11 and the Compton scattering angle $\theta_C$ determined by the above equation (A1).

An intensity of the scattering angle distribution function $f_O(\theta)$ (namely a value of the function $f_O(\theta)$) becomes maximum when the error angle $\Delta\theta$ is zero and decreases to zero along with an increase in an absolute value of the error angle $\Delta\theta$, as illustrated in FIG. 9.

In the reconstruction of the distribution image, a reverse projection operation is performed, in which the arrival direction of the gamma ray having a conical shape estimated from the measurement data of the gamma ray is projected to the image space IS. However, the arrival direction of the gamma ray having a conical shape estimated from the measurement data of the gamma ray includes an error based on the uncertainty described above, and hence it is necessary to project the cone having a thickness due to the error in the reverse projection operation. The thickness of the cone to be considered in the reverse projection is due to the uncertainty of the Compton scattering angle, and hence the thickness should be determined from the scattering angle distribution function $f_O(\theta)$.

The Compton conical surface having the thickness is referred to as a Compton conical surface area. The main arithmetic portion 30 can set the Compton conical surface area by assigning a thickness to the Compton conical surface for each event as described below.

The integral of the function $f_O(\theta)$ with respect to the angle $\theta$ in the range of "$-180° < \theta - \theta_C \leq 180°$" and the integral of the function $f_O(\theta)$ with respect to the angle $\theta$ in the range of "$-\theta_{REF} \leq \theta - \theta_C \leq \theta_{REF}$" are represented by $INT_A$ and $INT_B$, respectively. In this case, the positive angle $\theta_{REF}$ when a ratio of "$INT_B/INT_A$" becomes a positive predetermined value that is close to one and less than one (for example 95%) is determined.

Figure 11:
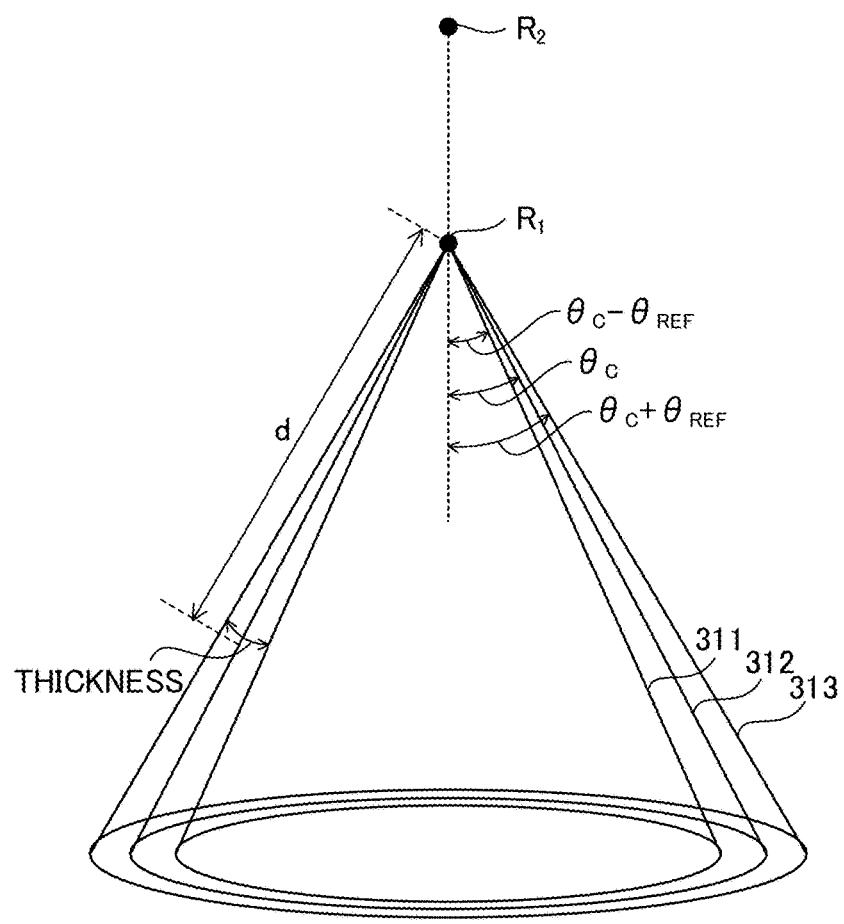
FIG. 11 is a diagram for explaining a thickness of a conical surface to be taken into consideration depending on the uncertainty of the Compton scattering angle.

FIG. 11 illustrates three conical surfaces 311 to 313 to be considered for certain one event. Each of the conical surfaces 311 to 313 has the vertex at the measured Compton scattering position $R_1$ and the center axis on the straight line of the propagation path of the gamma ray after the Compton scattering (namely, on the straight line passing through the positions $R_1$ and $R_2$). However, the conical surface 312 has the angle $\theta_C$ as the half vertex angle (half of the vertex angle; opening angle), while the conical surfaces 311 and 313 are respectively a lower limit conical surface having the angle ($\theta_C - \theta_{REF}$) as the half vertex angle and an upper limit conical surface having the angle ($\theta_C + \theta_{REF}$) as the half vertex angle.

The main arithmetic portion 30 sets the area between the lower limit conical surface 311 and the upper limit conical surface 313 as the Compton conical surface area. The Compton conical surface 312 is enclosed in the area between the lower limit conical surface 311 and the upper limit conical surface 313, namely the Compton conical surface area. ($\theta_{REF} \times 2$) corresponds to the above-mentioned thickness expressed by an angle. The thickness of the Compton conical surface at a part having a distance d from the position $R_1$ corresponds to a length of an arc having the radius d and the center angle ($\theta_{REF} \times 2$).

<<First Improved Method for Generating Distribution Image>>

A first improved method for generating the distribution image is described. The first improved method and improved methods described later are also based on the LM-ML-EM method similarly to the reference method described above. However, the first improved method generates the distribution image based on the following equation (D1).

[Mathematical 6]

$$\lambda_j^{(l+1)} = \lambda_j^{(l)} \sum_i \frac{v_{ij} t_{ij}}{s_{ij} \sum_k t_{ik} \lambda_k^{(l)}} \quad (D1)$$

Meanings of $\lambda_j^{(l)}$, $\lambda_j^{(l+1)}$ and $t_{ij}$ are as described above. Therefore, $t_{ij}\lambda_j$ represents an expected value with which the i-th event is measured by the gamma ray emitted from the pixel j having an accumulation amount (i.e. an abundance) of radionuclides corresponds to the pixel value $\lambda_j$. Symbols $v_{ij}$ and $s_{ij}$ are described later.

The main arithmetic portion 30 calculates the Compton scattering angle $\theta_C$ by the above equation (A1) on the basis of the measurement data in the i-th event, and it sets the Compton conical surface area in the i-th event based on the Compton conical surface of the i-th event having the Compton scattering angle $\theta_C$ as the half vertex angle and the scattering angle distribution function. Then, the main arithmetic portion 30 extracts the pixel crossing the Compton conical surface area in the i-th event, so as to set $t_{ij}$ larger than zero for each extracted pixel j. For each pixel j that does not cross the Compton conical surface area in the i-th event, $t_{ij}$ can be set to zero. This process of setting the system response function $t_{ij}$ is performed for each event. A known arbitrary method may be used as the method for setting the system response function $t_{ij}$ based on the measurement data of each event.

Meaning of the sum (Σ) in the equation (D1) is supplementarily described below. The expression (D1a) and the expression (D1b) are extracted parts of the equation (D1). In the expression (D1a), i and k represent the event number and the pixel number, respectively. The expression (D1a) expresses the sum of "$t_{ik}\lambda_k^{(l)}$" for all pixels in the i-th event. In the numerator of the expression (D1b), i and j represent the event number and the pixel number, respectively. The expression (D1b) indicates the sum of fractions having a denominator that is the product of the expression (D1a) and $s_{ij}$, and a numerator of "$v_{ij}t_{ij}$", for all events. The all events means all the events used for determining the pixel value of each pixel of the distribution image.

[Mathematical 7]

$$\sum_k t_{ik} \lambda_k^{(l)} \quad (D1a)$$

$$\sum_i \frac{v_{ij} t_{ij}}{s_{ij} \sum_k t_{ik} \lambda_k^{(l)}} \quad (D1b)$$

Introduction of $v_{ij}$

Figure 12:
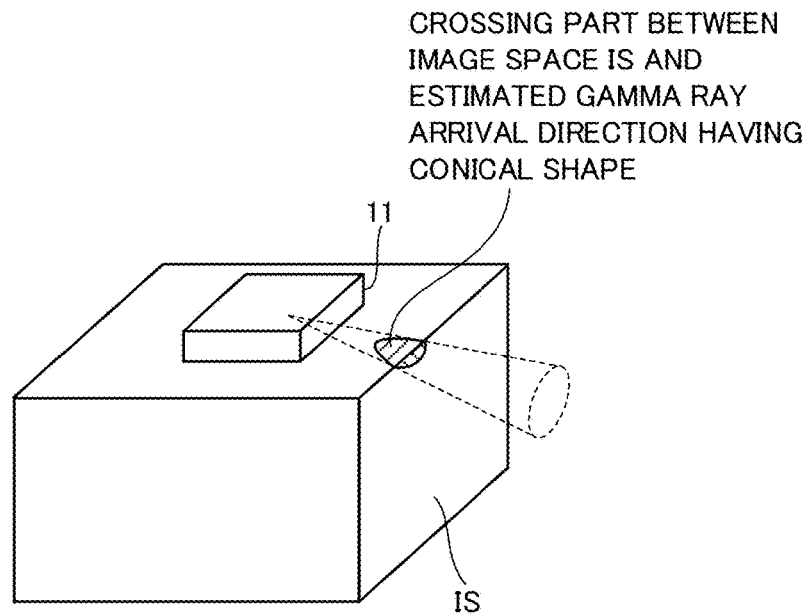
FIG. 12 is a diagram for explaining a situation in which a Compton conical surface crosses the image space only slightly.

In the reference method using the equation (B1), in a case where the number of detected gamma rays ($\Sigma_k t_{ik}\lambda_k$) estimated by calculation is very small or the like, there occurs overfitting in which the pixel value is updated to a very large value. This occurs, as illustrated in FIG. 12, in a case where the estimated gamma ray arrival direction to have a conical shape crosses the image space IS in a skimming manner, and it causes an artifact (virtual image) in a periphery of the image.

Figure 13:
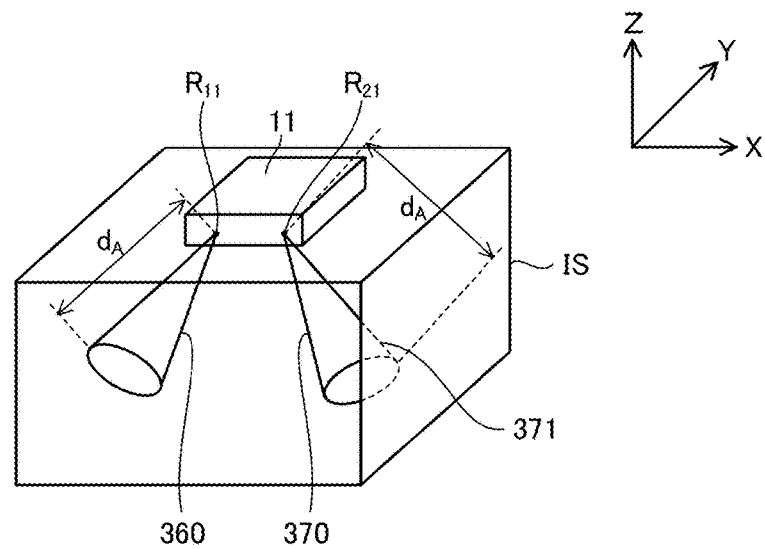
FIG. 13 is a diagram illustrating an example of a state in which Compton conical surfaces of two events cross the image space.

With reference to FIG. 13 and the like, this phenomenon is additionally described. In FIG. 13, a cone 360 has a side surface that is the Compton conical surface derived based on the measurement data in the first event and a generatrix length of $d_A$, and a cone 370 has a side surface that is the Compton conical surface derived based on the measurement data in the second event and a generatrix length of $d_A$. In the vicinity of the bottom surface of the cone 360, the cone 360 is within the image space IS, while a part of the cone 370 is out of the image space IS in the vicinity of the bottom surface of the cone 370. In the illustration of the cone 370 in FIG. 13, a part in which the cone 370 and the image space IS cross each other (namely, a part of the cone 370 positioned within the image space IS) is illustrated by a solid line, while a part in which the cone 370 and the image space IS do not cross each other is illustrated by a broken line (corresponding to a broken line 371).

Here, it is supposed that there are a spherical surface having the center at the Compton scattering position $R_{11}$ and the radius $d_A$ in the first event (hereinafter referred to as a first spherical surface), and a spherical surface having the center at the Compton scattering position $R_{21}$ and the radius $d_A$ in the second event (hereinafter referred to as a second spherical surface). In FIG. 14A, numeral 380 denotes a projection on the XY plane of a curved surface that is a crossing part between the first spherical surface and the image space IS. In FIG. 14B, numeral 390 denotes a projection on the XY plane of a curved surface that is a crossing part between the second spherical surface and the image space IS. The shape of the projection on the XY plane of the crossing part between the first spherical surface and the image space IS may not be a rectangle in reality, but it is supposed to be a rectangle in FIG. 14A for simplification. The same is true in FIG. 14B.

When the thickness based on the scattering angle distribution function is assigned to the Compton conical surface based on the measurement data in the first event, the Compton conical surface area in the first event is set. In FIG. 14A, a hatched area 381 indicates a crossing area between the Compton conical surface area in the first event and the curved surface 380 (namely, a crossing area among the Compton conical surface area in the first event, the first spherical surface, and the image space IS). In FIG. 14B, a hatched area 391 indicates a crossing area between the Compton conical surface area in the second event and the curved surface 390 (namely, a crossing area among the Compton conical surface area in the second event, the second spherical surface, and the image space IS). In FIG. 14B, a dotted area 392 indicates an area that does not cross the image space IS in the crossing area between the Compton conical surface area in the second event and the second spherical surface.

Here, it is supposed that a ratio of the area that crosses the image space IS to the crossing area between the Compton conical surface area in the first event and the first spherical surface is 100%. Therefore, when it is supposed that there are 100 pixels belonging to the area 381, and that the gamma ray source in the first event is disposed at a position apart from the Compton scattering position $R_{11}$ by the distance $d_A$, and that the scattering angle distribution function in the area 381 has a uniform intensity, then a probability that the gamma ray source in the first event exists in each pixel belonging to the area 381 is estimated to be uniformly and approximately "1/100", and the system response function $t_{ij}$ is set based on such estimation.

On the other hand, it is supposed that a ratio of the area that crosses the image space IS to the crossing area between the Compton conical surface area in the second event and the second spherical surface is 50%. Therefore, when it is supposed that there are 50 pixels belonging to the area 391, and that the gamma ray source in the second event is disposed at a position apart from the Compton scattering position $R_{21}$ by the distance $d_A$, and that the scattering angle distribution function in the area 391 has a uniform intensity, then a probability that the gamma ray source in the second event exists in each pixel belonging to the area 391 is estimated to be uniformly and approximately "1/50", and a system response function $t_{2j}$ is set based on such estimation.

However, if it is supposed that the areas 391 and the 392 are all within the image space IS, it must be estimated that the gamma rays arrived from one of the approximately 100 pixels in each event, and therefore a probability that the gamma ray source in the second event exists in each pixel belonging to the area 391 is to be estimated to be uniformly and approximately "1/100". However, in reality, a part (area 392) of the crossing area between the Compton conical surface area and the second spherical surface is positioned outside the image space IS, and hence a probability that the gamma ray source in the second event exists in each pixel belonging to the area 391 is estimated to be approximately "1/50". In other words, as to the area 391, it is apt to be excessively estimated that the gamma ray source exists therein. The execution of such uncertain estimation is due to the fact that the part (area 392) of the crossing area between the Compton conical surface area and the second spherical surface is positioned outside the image space IS.

Such aptitude can also occur among a plurality of pixels in one event. In FIG. 15, a cone 410 has the side surface that is the Compton conical surface derived based on the measurement data in the i-th event and a generatrix length of $d_A$, and a cone 420 has the side surface that is the Compton conical surface derived based on the measurement data in the i-th event and a generatrix length of $d_B$ ($0<d_A<d_B$). Because the cones 410 and 420 correspond to the same event and "$0<d_A<d_B$" holds, the conical surface of the cone 410 is a part of the conical surface of the cone 420. The cone 410 is within the image space IS in the vicinity of the bottom surface of the cone 410, while a part of the cone 420 is out of the image space IS in the vicinity of the bottom surface of the cone 420. In the illustration of the cone 420 in FIG. 15, a part in which the cone 420 and the image space IS cross each other (namely, a part of the cone 420 positioned within the image space IS) is illustrated by a solid line, while a part in which the cone 420 and the image space IS do not cross each other is illustrated by a broken line (corresponding to a broken line 421).

Figure 16A:
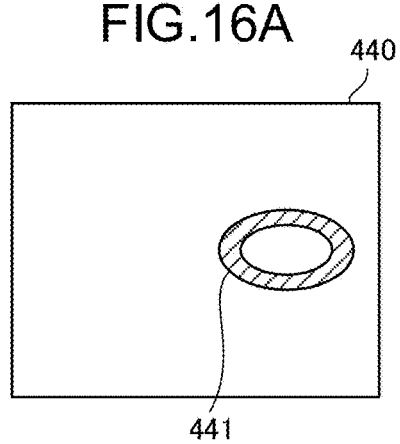
FIGS. 16A and 16B are diagrams illustrating examples of states in which Compton conical surface areas of one event cross the image space.
Figure 16B:
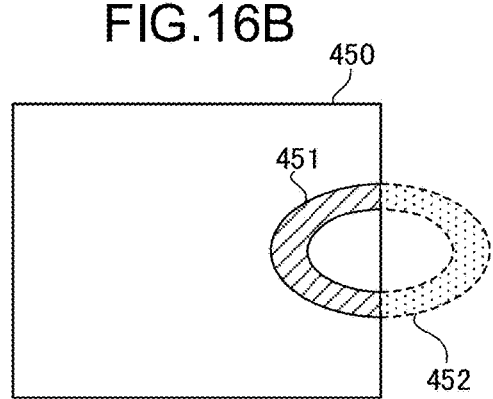

Here, it is supposed that there are a spherical surface having the center at the Compton scattering position $R_{i1}$ and the radius $d_A$ in the i-th event (hereinafter referred to as a spherical surface A), and a spherical surface having the center at the Compton scattering position $R_{i1}$ and the radius $d_B$ in the i-th event (hereinafter referred to as a spherical surface B). In FIG. 16A, numeral 440 denotes a projection on the XY plane of a curved surface that is a crossing part between the spherical surface A and the image space IS. In FIG. 16B, numeral 450 denotes a projection on the XY plane of a curved surface that is a crossing part between the spherical surface B and the image space IS. The shape of the projection on the XY plane of the crossing part between the spherical surface A and the image space IS may not be a rectangle in reality, but it is supposed to be a rectangle in FIG. 16A for simplification. The same is true in FIG. 16B.

When the thickness based on the scattering angle distribution function is assigned to the Compton conical surface based on the measurement data in the i-th event, the Compton conical surface area in the i-th event is set. In FIG. 16A, a hatched area 441 indicates a crossing area between the Compton conical surface area in the i-th event and the curved surface 440 (namely, a crossing area among the Compton conical surface area in the i-th event, the spherical surface A, and the image space IS). In FIG. 16B, a hatched area 451 indicates a crossing area between the Compton conical surface area in the i-th event and the curved surface 450 (namely, a crossing area among the Compton conical surface area in the i-th event, the spherical surface B, and the image space IS). In FIG. 16B, a dotted area 452 indicates an area that does not cross the image space IS in the crossing area between the Compton conical surface area in the i-th event and the spherical surface B.

Here, it is supposed that a ratio of the area that crosses the image space IS to the crossing area between the Compton conical surface area in the i-th event and the spherical surface A is 100%. Therefore, when it is supposed that there are $N_A$ pixels belonging to the area 441, and that the gamma ray source in the i-th event is disposed at a position apart from the Compton scattering position $R_{i1}$ by the distance $d_A$, and that the scattering angle distribution function in the area 441 has a uniform intensity, then a probability that the gamma ray source in the i-th event exists in each pixel belonging to the area 441 is estimated to be uniformly and approximately "$1/N_A$", and the system response function $t_{ij}$ is set based on such estimation.

On the other hand, it is supposed that a ratio of the area that crosses the image space IS to the crossing area between the Compton conical surface area in the i-th event and the spherical surface B is 50%. Therefore, when it is supposed that there are $N_B$ pixels belonging to the area 451, and that the gamma ray source in the i-th event is disposed at a position apart from the Compton scattering position $R_{i1}$ by the distance $d_B$, and that the scattering angle distribution function in the area 451 has a uniform intensity, then a probability that the gamma ray source in the i-th event exists in each pixel belonging to the area 451 is estimated to be uniformly and approximately "$1/N_B$", and the system response function $t_{ij}$ is set based on such estimation.

However, if it is supposed that the areas 451 and 452 are all within the image space IS, it must be estimated that the gamma ray arrived from one of the approximately ($2 \times N_B$) pixels, and therefore a probability that the gamma ray source in the i-th event exists in each pixel belonging to the area 451 is to be estimated to be uniformly and approximately "$1/(2 \times N_B)$". However, in reality, a part (area 452) of the crossing area between the Compton conical surface area and the spherical surface B is positioned outside the image space IS, and hence a probability that the gamma ray source in the i-th event exists in each pixel belonging to the area 451 is estimated to be approximately "$1/N_B$". In other words, as to the area 451, it is apt to be excessively estimated that the gamma ray source exists therein. The execution of such uncertain estimation is due to the fact that the part (area 452) of the crossing area between the Compton conical surface area and the spherical surface B is positioned outside the image space IS.

The probability parameter $v_{ij}$ introduced in the first improved method (see the above equation (D1)) works as a regularization factor for suppressing such phenomenon (overfitting). The parameter $v_{ij}$ is defined by the following equation (D2).

[Mathematical 8]

$$v_{ij} = \sum_{\{k|r \in V_k, |R_{i1} - r_j| = |R_{i1} - r|\}} p_{ik} \tag{D2}$$

As clear from the above description, $R_{i1}$ represents the interaction position between the gamma ray detected in the i-th event and the first-stage detector 11 (namely the Compton scattering position) (see FIG. 8), and it indicates a vertex position of the Compton conical surface in the i-th event. Symbol $r_j$ represents a position of the pixel j (the center position). Symbol r represents an arbitrary position (coordinates) in the image space IS. Symbol $V_k$ represents a volume of the pixel k. "$r \in V_k$" represents a position r enclosed in the pixel k (namely coordinates r enclosed in the volume of the pixel k). Therefore, $v_{ij}$ represents the sum of $p_{ik}$ for all pixels k, which cross the spherical surface having the center at the Compton scattering position $R_{i1}$ in the i-th event and the radius that is a distance between the position ($r_j$) of the pixel j and the Compton scattering position $R_{i1}$.

The probability parameter $v_{ij}$ indicates a probability that the Compton-scattered gamma ray in the i-th event arrived from within the image space IS. However, the probability parameter is set for each pixel, and $v_{ij}$ is the probability parameter set for the pixel j. More specifically, when it is supposed that the Compton-scattered gamma ray in the i-th event arrived from a position on the spherical surface having the center at the Compton scattering position $R_{i1}$ and the radius that is the distance between the position ($r_j$) of the pixel j and the Compton scattering position $R_{i1}$, $v_{ij}$ indicates a probability that the gamma ray arrived from within the image space IS.

Because of the uncertainty of the Compton scattering angle, the gamma ray arrival direction estimated for the i-th event is a direction having a width, and $p_{ik}$ represents a ratio of the gamma ray arrival direction passing through the pixel k to the gamma ray arrival direction estimated for the i-th event. In other words, $p_{ik}$ represents a probability density of the gamma ray arrival direction passing through the pixel k when the gamma ray arrival direction of the i-th event is regarded as a probability variable. As shown in the equation (D2), $v_{ij}$ is the sum of $p_{ik}$ for all pixels k enclosing the position r that satisfies "$|R_{i1}-r_j|=|R_{i1}-r|$", and hence $p_{ik}$ represents a contribution of the pixel k to $v_{ij}$.

The value $p_{ik}$ is based on the uncertainty of the Compton scattering angle and is defined by the equation (D3). Note that, in the equation (D3), $p_{ij}$ is defined by using a variable j instead of a variable k in $p_{ik}$. An angle $\theta_i(r)$ in the equation (D3) is defined by the equation (D3a).

[Mathematical 9]

$$p_{ij} = \int_{r \in V_j} \frac{f_{O,i}[\theta_i(r)]}{|r - R_{i1}|^2 2\pi \sin[\theta_i(r)]} dr \quad (D3)$$

$$\theta_i(r) = \cos^{-1}\left(\frac{R_{i1} - R_{i2}}{|R_{i1} - R_{i2}|} \cdot \frac{r - R_{i1}}{|r - R_{i1}|}\right) \quad (D3a)$$

Symbol $f_{O,i}$ represents the scattering angle distribution function in the i-th event (the distribution function of the error distribution of the Compton scattering angle). In the equation (D3), $f_{O,i}$ is regarded as a function of the angle $\theta_i(r)$ depending on the position r. The position r indicates an arbitrary position in the image space IS as described above and can be regarded as corresponding to the noted position NP in FIG. 10. The angle $\theta_i(r)$ represents the Compton scattering angle of the gamma ray when it is supposed that the i-th event is generated by the gamma ray emitted from the position r. Symbols $R_{i1}$ and $R_{i2}$ respectively represent the interaction position between the gamma rays detected in the i-th event and the detector 11 (namely the detected Compton scattering position) and the interaction position between the gamma ray detected in the i-th event and the detector 12 (namely the detected photoelectric absorption position). Symbol $V_j$ represents a volume of the pixel j. In the equation (D3), the position r is used as an integral variable, and "$f_{O,i}[\theta_i(r)]/\{|r-R_{i1}|^2 2\pi \sin[\theta_i(r)]\}$" is integrated with respect to the position r belonging to the pixel j so that $p_{ij}$ is obtained.

When considering the scattering angle distribution function $f_O(\theta)$ as $f_{O,i}[\theta_i(r)]$, $\theta_C$ in the above equation (C1) is the Compton scattering angle calculated for the i-th event using the equation (A1). When considering the scattering angle distribution function $f_O(\theta)$ as $f_{O,i}[\theta_i(r)]$, $\theta$ in the above equation (C1) represents $\theta_i(r)$ and corresponds to the angle between the straight line connecting the positions $R_{i1}$ and $R_{i2}$ (the center axis of the Compton conical surface) and the straight line connecting the positions $R_{i1}$ and r.

Figure 17:
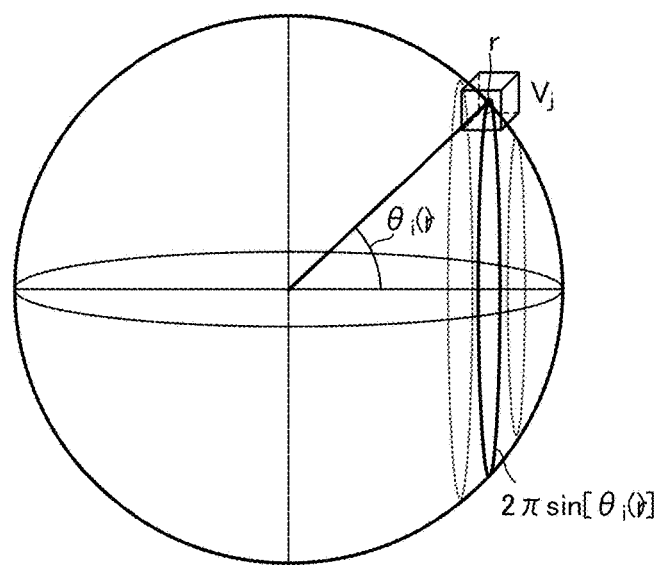
FIG. 17 is a diagram for explaining meaning of a structural element ($p_{ij}$) of a probability parameter ($v_{ij}$).

A value of $f_{O,i}[\theta_i(r)]$ indicates a probability density of the error distribution of the Compton scattering angle at the position r, and this is integrated over the volume $V_j$ of the pixel j so that $p_{ij}$ is determined. However, in a simple integral, the geometrical efficiency of the detector 11 viewed from the pixel j is not taken into consideration. In addition, because $f_{O,i}$ is a function of an angle, it is necessary to consider the solid angle due to an angle difference. Therefore, in the equation (D3), $f_{O,i}[\theta_i(r)]$ is divided by the inverse of "$|r-R_{i1}|^{-2}$" as approximation of the geometrical efficiency and a micro solid angle "$2\pi \sin[\theta_i(r)]$" of the angle $\theta_i(r)$, and the result is integrated (see FIG. 17).

Note that, in each event, a value of the function $f_{O,i}$ for a pixel that does not belong to the Compton conical surface area is considered to be sufficiently small. Therefore the right side of the equation (D2) can be considered to be the sum of $p_{ik}$ for all pixels k that enclose the position r satisfying "$|R_{i1}-r_j|=|R_{i1}-r|$" and belong to the Compton conical surface area in the i-th event. When the spherical surface having the center at the position $R_{i1}$ and the radius of the distance $|R_{i1}-r_j|$ passes through an arbitrary position in the pixel k so as to cross the pixel k, "$|R_{i1}-r_j|=|R_{i1}-r|$" is satisfied for the pixel k.

In this way, the main arithmetic portion 30 according to the first improved method sets the probability parameter $v_{ij}$ indicating a probability that the Compton-scattered gamma ray arrived from within the image space IS in each event, for each pixel of the distribution image, by calculation based on the measurement data in each event ($R_{i1}$, $R_{i2}$, $E_{i1}$, $E_{i2}$), and it generates the distribution image using the probability parameter $v_{ij}$ set for each pixel (namely determines a pixel value of each pixel).

The pixel (target pixel) for which the probability parameter $v_{ij}$ should be set based on the measurement data in each event is not necessarily all pixels of the distribution image (however, may be all pixels of the distribution image). In each event, it is sufficient if each pixel in the Compton conical surface area is included in the target pixels for which the probability parameter $v_{ij}$ should be set. In other words, it is sufficient to calculate $v_{ij}$ based on the equation (D2) for only each pixel within the Compton conical surface area in each event. In each event, $v_{ij}$ can be set to zero for each pixel outside the Compton conical surface area.

Considering above, the main arithmetic portion 30 according to the first improved method can also be said to individually set the probability parameter $v_{ij}$ to each of the plurality of target pixels within the distribution image by calculation based on the measurement data in each event, so as to generate the distribution image using the set probability parameter $v_{ij}$ (namely to determine a pixel value of each pixel). The main arithmetic portion 30 sets the probability parameter $v_{ij}$ for each event and for each target pixel. In other words, the main arithmetic portion 30 notes each combination of the plurality of events and the plurality of target pixels, so as to set the probability parameter $v_{ij}$ for each combination.

When noting the i-th event and the one pixel j (when noting the combination of the i-th event and the pixel j), the main arithmetic portion 30 sets the probability parameter $v_{ij}$ for the noted pixel j in the noted i-th event, on the basis of a crossing state among the spherical surface having the center at the detected Compton scattering position $R_{i1}$ and the radius that is the distance between the position ($r_j$) of the noted pixel j and the Compton scattering position $R_{i1}$ (for example $d_A$ or $d_B$ in FIG. 15), the Compton conical surface area of the noted i-th event, and the image space IS. For example, the hatched area 441 in FIG. 16A or the hatched area 451 in FIG. 16B corresponds to the crossing area among the above-mentioned spherical surface, the Compton conical surface area, and the image space IS. The crossing state among them is different between FIGS. 16A and 16B.

More specifically, when noting the i-th event and the one pixel j, the main arithmetic portion 30 determines the crossing area (for example the hatched area 441 in FIG. 16A or the hatched area 451 in FIG. 16B) among the spherical surface having the center at the detected Compton scattering position $R_{i1}$ and the radius that is the distance between the position ($r_j$) of the noted pixel j and the Compton scattering position $R_{i1}$ (for example $d_A$ or $d_B$ in FIG. 15), the Compton conical surface area in the noted i-th event, and the image space IS. Next, the main arithmetic portion 30 extracts each pixel disposed in the crossing area and derives an index ($p_{ij}$) corresponding to an intensity of the scattering angle distribution function ($f_{O,i}$) for the extracted each pixel (see the equation (D3)). Then, on the basis of the sum of the index derived for the extracted each pixel (see the equation (D2)), the main arithmetic portion 30 sets the probability parameter $v_{ij}$ for the noted pixel j in the noted i-th event.

Because $v_{ij}$ is considered to be an integral of the scattering angle uncertainty over the entire scattering angle range as the integral range, an ideal value of $v_{ij}$ is one. However, if a part of the Compton conical surface area is outside the image space IS, $v_{ij}$ is smaller than one. Therefore, in the event in which the Compton conical surface area crosses the image space IS only slightly, contribution to the reconstructed image (distribution image) is decreased by the introduction of $v_{ij}$, so that the artifact is reduced. Further, as described above with reference to FIGS. 15, 16A, and 16B, the above-mentioned crossing state is different if the noted pixel is different even in one event. This is taken into consideration in the first improved method, and an optimal value of $v_{ij}$ is set for each pixel in each event, so that the effect of reducing the artifact is enhanced.

Introduction of $s_{ij}$

Among factors constituting the detection sensitivity, the factor having the largest influence is the geometrical efficiency of the detector 11 viewed from each pixel j, and the geometrical efficiency is approximately proportional to the inverse square of the distance between the pixel j and the detector 11. However, in the reference method using the equation (B1), it is supposed that the detection sensitivity ($s_j$) depends only on a position of the pixel j, and hence a difference of the geometrical efficiency due to a difference of the Compton scattering position (interaction position in the detector 11) is averaged.

Specifically, with reference to FIG. 18, the distance (511, 521) between the Compton scattering position and the pixel j is different between the case where the Compton scattering position is a position 510 and the case where the Compton scattering position is a position 520. As a result, the geometrical efficiency must be different, but if it is supposed that the detection sensitivity ($s_j$) depends only on a position of the pixel j, the difference of the geometrical efficiency due to the difference of the Compton scattering position is averaged. As the pixel is closer to the detector 11, the influence of the averaging is larger (because the difference between the distances 511 and 521 is apt to be generated), and hence sensitivity correction accuracy using the detection sensitivity parameter is deteriorated.

Therefore, in the first improved method, the detection sensitivity parameter for each pixel is set by also taking the Compton scattering position $R_{i1}$ for each event into consideration. Symbol $s_{ij}$ in the above equation (D1) is the detection sensitivity parameter indicating the detection sensitivity of the detector 11 for the Compton scattering in the i-th event. However, the detection sensitivity parameter is set for each pixel, and $s_{ij}$ is the detection sensitivity parameter set for the pixel j. In the above equation (D1), division by $s_{ij}$ means correction of the pixel value by taking the detection sensitivity into consideration. FIGS. 19A and 19B illustrate comparison diagrams between the reference method and the first improved method. The detection sensitivity parameter $s_{ij}$ is defined by the following equation (D4).

[Mathematical 10]

$$s_{ij} = \exp[-\sigma_t(E_0)d_{i,j1}] \cdot |R_{i1} - r_j|^{-2} \quad (D4)$$

Figure 20:
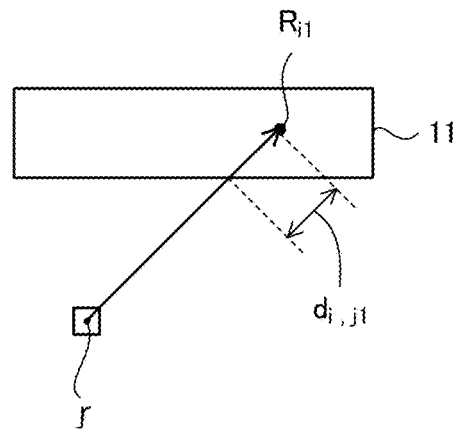
FIG. 20 is a diagram for explaining a range of gamma ray in the detector.

Here, $\sigma_t(E_0)$ represents the all interaction cross-sectional area between the gamma ray having energy of $E_0$ and the detector substance, and $d_{i,j1}$ represents a range of the gamma ray from the pixel j in the detector 11 in the i-th event (see FIG. 20). In other words, $d_{i,j1}$ represents an distance that the gamma ray from the pixel j travel in the detector 11 before being Compton-scattered in the i-th event. Therefore, "exp $[-\sigma_t(E_0)d_{i,j1}]$" represents a probability that the gamma ray from the pixel j reaches the Compton scattering position $R_{i1}$ without interaction with the detector substance in the detector 11 in the i-th event (namely attenuation of the gamma ray from the pixel j before being Compton-scattered in the detector 11 in the i-th event). A value of $\sigma_t(E_0)$ is uniquely determined based on the initial energy $E_0$ of the gamma ray emitted from the gamma ray source 201 and physical properties of the detector substance and is known to the imaging device 1. The range $d_{i,j1}$ is determined from the position $r_j$ of the pixel j, the Compton scattering position $R_{i1}$ in the i-th event, and a shape of the detector 11.

Figure 21A:
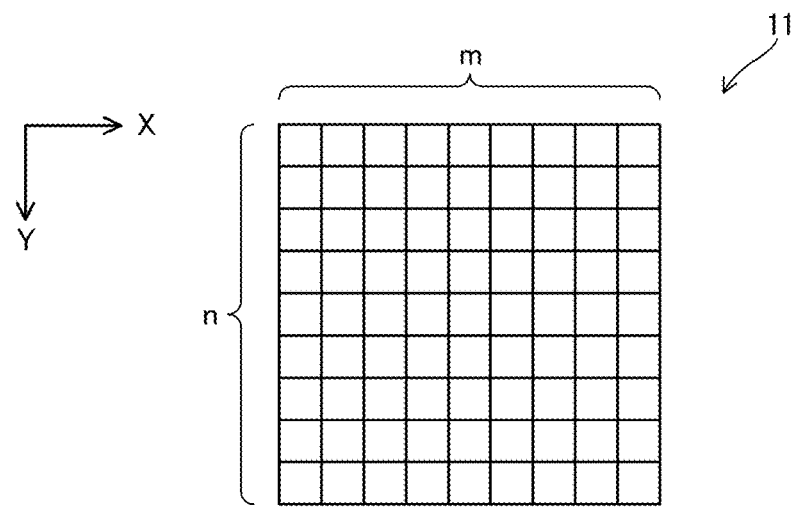
FIGS. 21A and 21B are diagrams for explaining that the detector can be regarded as a set of detector elements.
Figure 21B:
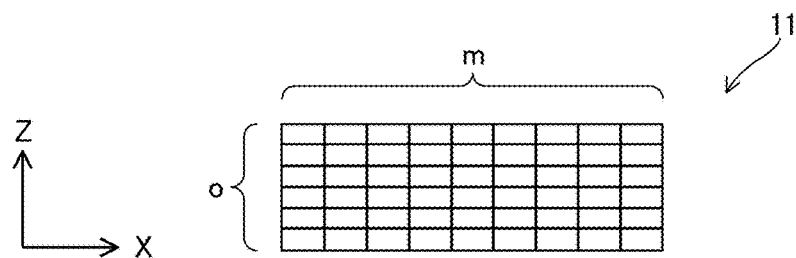

Here, as illustrated in FIGS. 21A and 21B, it is supposed that the detector 11 can detect the interaction position with m, n, and o steps in the X-axis, Y-axis, and Z-axis directions, respectively (m, n, and o are arbitrary integers of two or more). Then, the detector 11 can be considered to be a set of (m×n×o) independent detector elements. With this consideration, each detector element has a detection sensitivity for all pixels in the image space IS. The position $R_{i1}$ can be considered to indicate the center position of the detector element enclosing the Compton scattering position in the i-th event. Then, "$|R_{i1} - r_j|^{-2}$" represents an approximation of the geometrical efficiency of the detector element having the center at the position $R_{i1}$, viewed from the pixel j.

In this way, the main arithmetic portion 30 according to the first improved method sets the detection sensitivity parameter $s_{ij}$ indicating a detection sensitivity of Compton scattering in each event for each pixel of the distribution image, by calculation based on the measurement data (including $R_{i1}$) in each event, so as to generate the distribution image (namely to determine a pixel value of each pixel) using the detection sensitivity parameter $s_{ij}$ set for each pixel.

The pixel (target pixel) for which the detection sensitivity parameter $s_{ij}$ should be set based on the measurement data in each event is not necessarily all pixels of the distribution image (however, may be all pixels of the distribution image). In each event, it is sufficient if each pixel in the Compton conical surface area is included in the target pixels for which the detection sensitivity parameter $s_{ij}$ should be set. In other words, it is sufficient to calculate $s_{ij}$ based on the equation (D4) for only each pixel within the Compton conical surface area in each event. In each event, a constant value may be substituted into $s_{ij}$ for each pixel outside the Compton conical surface area.

Considering above, the main arithmetic portion 30 according to the first improved method can also be said to individually set the detection sensitivity parameter $s_{ij}$ to each of the plurality of target pixels within the distribution image by calculation based on the measurement data in each event, so as to generate the distribution image using the set detection sensitivity parameter $s_{ij}$ (namely to determine a pixel value of each pixel). The main arithmetic portion 30 sets the detection sensitivity parameter $s_{ij}$ for each event and for each target pixel. In other words, the main arithmetic portion 30 notes each combination of the plurality of events and the plurality of target pixels, so as to set the detection sensitivity parameter $s_{ij}$ for each combination.

When noting the i-th event and the one pixel j (when noting the combination of the i-th event and the pixel j), the main arithmetic portion 30 sets the detection sensitivity parameter ($s_{ij}$) in accordance with the detected Compton scattering position $R_{i1}$ and the position $r_j$ of the noted pixel j. More specifically, when noting the i-th event and the one pixel j, the main arithmetic portion 30 sets the detection sensitivity parameter $s_{ij}$ for the noted pixel j in the noted i-th event, on the basis of the range $d_{i,j1}$ of the gamma ray before being Compton-scattered in the detector 11 based on the Compton scattering position $R_{i1}$, and on the basis of the position $r_j$ of the noted pixel j, and the distance $|R_{i1}-r_j|$ between the Compton scattering position $R_{i1}$ and the position $r_j$ of the noted pixel j.

For example, if the distance between the gamma ray source and the detector 11 is relatively small, the gamma rays from the gamma ray source easily hit the detector 11 and hence are easily detected by the detector 11. If the distance between the gamma ray source and the detector 11 is relatively large, the gamma rays from the gamma ray source hardly hit the detector 11 and hence are hardly detected by the detector 11. If the distribution image is generated without taking such easiness/hardness of being detected into consideration, existence of the gamma ray source distant from the detector 11 is hardly reflected on the distribution image. By introduction of the detection sensitivity parameter, sensitivity correction is performed by taking the easiness/hardness of being detected into consideration. In this case, if the detection sensitivity parameter ($s_{ij}$) is set by considering not only the position of each pixel but also the interaction position $R_{i1}$ in the detector 11, more appropriate sensitivity correction can be performed than the method of setting the detection sensitivity parameter without considering the interaction position $R_{i1}$ (FIG. 19A). As a result, the distribution image expresses distribution of the gamma ray source more accurately. In addition, in the first improved method, the gamma ray attenuation in the detector 11 ($\exp[-\sigma_t(E_0)d_{i,j1}]$) is also taken into consideration by using the interaction position $R_{i1}$, and hence validity of the distribution image is enhanced (estimation accuracy of the gamma ray source distribution is enhanced).

About $t_{ij}$

The system response function $t_{ij}$ is determined according to the following equation (D5).

[Mathematical 11]

$$t_{ij} = \exp[-\sigma_t(E_0)d_{i,j1}] \cdot \frac{d\sigma_{c,ij}}{d\Omega} \cdot p_{ij} \cdot \exp[-\sigma_t(E_0')d_{i,12}] \cdot |R_{i2}-R_{i1}|^{-2} \cdot \sigma_p(E_0') \quad (D5)$$

In the equation (D5), "$\exp[-\sigma_t(E_0)d_{i,j1}]$" is the same as that shown in the above equation (D4) and represents a probability that the gamma ray from the pixel j in the i-th event reaches the Compton scattering position $R_{i1}$ without interaction with the detector substance in the detector 11. In the equation (D5), "$d\sigma_{c,ij}/d\Omega$" represents a Compton scattering differential cross-sectional area when the gamma ray emitted from the pixel j is detected as the gamma ray forming the i-th event. In other words, "$d\sigma_{c,ij}/d\Omega$" represents a probability that the gamma ray from the pixel j in the i-th event is Compton-scattered. This probability varies according to the Compton scattering angle, and hence "$d\sigma_{c,ij}/d\Omega$" depends on the pixel j.

$E_0'$ represents energy of the gamma ray after the Compton scattering. Therefore, $E_0'$ in the equation (D5) corresponds to the initial energy $E_0$ of the gamma ray minus the detected energy $E_1$ in the i-th event. Symbol $\sigma_t(E_0')$ represents the all interaction cross-sectional area of the gamma ray having the energy $E_0'$ with the detector substance, and $d_{i,12}$ represents a range of the gamma ray in the detectors 11 and 12 before the gamma ray after the Compton scattering is photoelectrically absorbed by the detector 12 in the i-th event. In other words, $d_{i,12}$ represents a distance that the gamma ray after the Compton scattering traveled in the detectors 11 and 12 before photoelectrically absorbed by the detector 12 in the i-th event. Therefore, "$\exp[-\sigma_t(E_0')d_{i,12}]$" represents a probability that the gamma ray after the Compton scattering reaches the photoelectric absorption position $R_{i2}$ without interaction with the detector substance in the detectors 11 and 12 in the i-th event (namely attenuation of the gamma ray after the Compton scattering before photoelectrically absorbed at the position $R_{i2}$ by the detector 12 in the detectors 11 and 12 in the i-th event).

$|R_{i2}-R_{i1}|^{-2}$ represents an approximation of the geometrical efficiency (solid angle) of the photoelectric absorption position $R_{i2}$ viewed from the Compton scattering position $R_{i1}$. Symbol $\sigma_p(E_0')$ represents a photoelectric absorption cross-sectional area between the gamma ray having energy $E_0'$ and the detector substance, namely a probability that the gamma ray after the Compton scattering is photoelectrically absorbed.

The main arithmetic portion 30 can derive and set the system response function $t_{ij}$ for each event and for each pixel based on the measurement data ($R_{i1}$, $R_{i2}$, $E_{i1}$, $E_{i2}$) for each event. Among physical quantities in the right side of the equation (D5), values of the physical quantities that do not depend on the measurement data in the i-th event are known to the imaging device 1.

[Flowchart of Operation of Generating Distribution Image]

Figure 22:
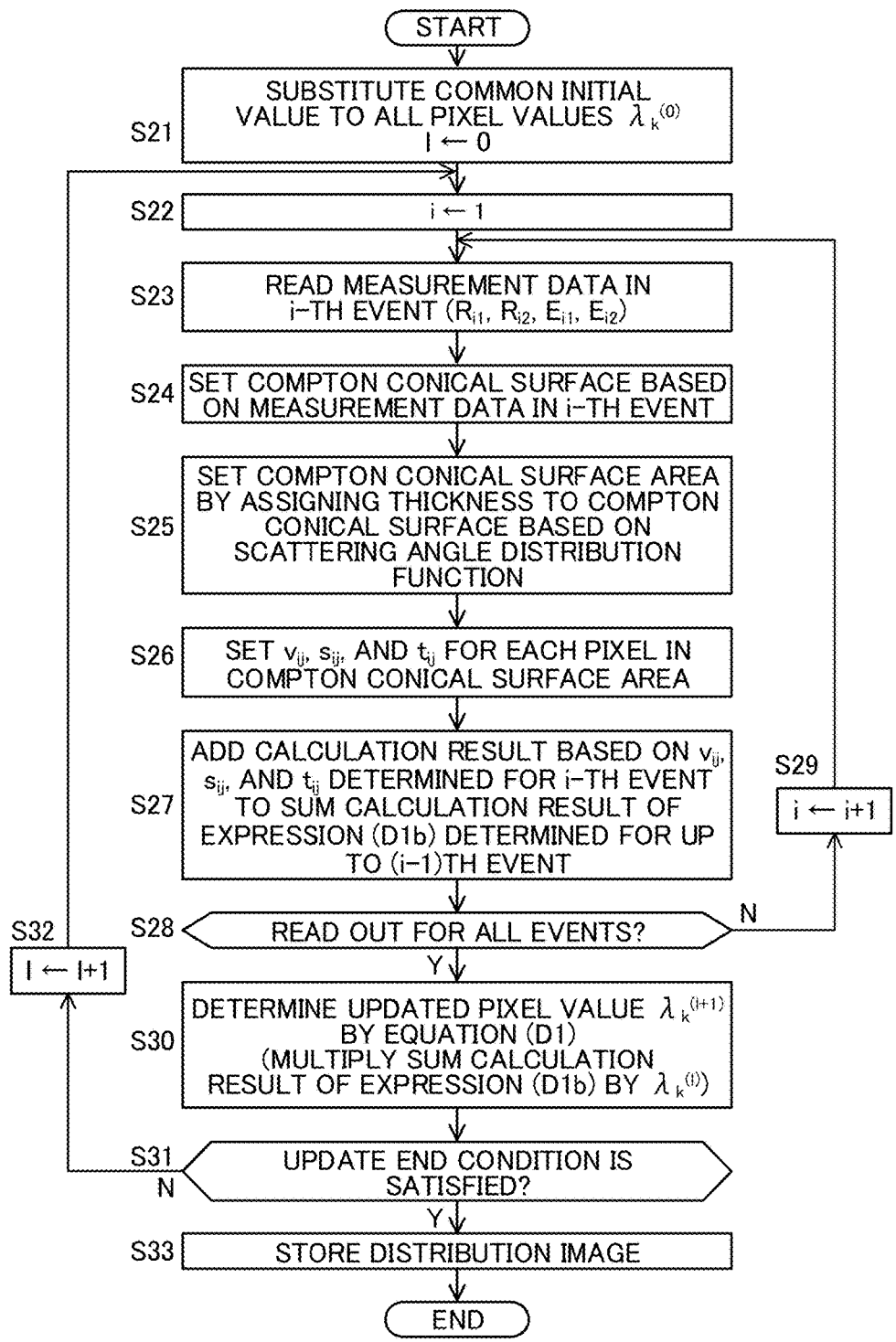
FIG. 22 is a flowchart illustrating an operation of generating a distribution image based on measurement data in each event.

FIG. 22 illustrates a flowchart of an operation of generating the distribution image based on the measurement data in each event. With reference to FIG. 22, there is described an operation procedure of generating the distribution image based on the measurement data in each event. After obtaining the measurement data in each event according to FIG. 4, the process proceeds to Step S21. In Step S21, the main arithmetic portion 30 substitutes predetermined common initial value (e.g. one) to pixel values $\lambda_k^{(0)}$ of all pixels of the distribution image and substitutes zero to a variable 1 indicating the number of iterative calculations. In the next Step S22, the main arithmetic portion 30 substitutes one to a variable i, and then sequentially executes processes of Steps S23 to S28.

Specifically, the main arithmetic portion 30 reads the measurement data in the i-th event ($R_{i1}$, $R_{i2}$, $E_{i1}$, $E_{i2}$) from the storage portion 44 in Step S23, and then it calculates the Compton scattering angle $\theta_C$ according to the above equation (A1) based on the measurement data in the i-th event so as to set the Compton conical surface in Step S24. In the next Step S25, the main arithmetic portion 30 sets the Compton conical surface area in the i-th event by assigning a thickness to the Compton conical surface in the i-th event based on the scattering angle distribution function $f_O(\theta)$. After that, in Step S26, the main arithmetic portion 30 regards each pixel in the Compton conical surface area in the i-th event as the target pixel so as to calculate and set $v_{ij}$, $s_{ij}$, and $t_{ij}$ based on the measurement data according to the above equations and the like for each target pixel. The system response function $t_{ij}$ should be set to zero for each pixel outside the Compton conical surface area (non-target pixel).

In Step S27 after Step S26, the main arithmetic portion 30 adds the calculation result based on $v_{ij}$, $s_{ij}$, and $t_{ij}$ for the i-th event to the sum calculation result of the expression (D1b) for up to the (i−1)th event, so as to determine the sum calculation result of the expression (D1b) from the first to the i-th events (namely, a value of the expression (D1b)). After that, in Step S28, it is checked whether or not the measurement data for all events are read out from the storage portion 44. If there is unread measurement data (N in Step S28), one is added to the variable i in Step S29, and the process returns to Step S23 so that the processes of Steps S23 to S28 are repeated. If the measurement data for all events are read out from the storage portion 44 (Y in Step S28), the process proceeds to Step S30.

In Step S30, the main arithmetic portion 30 performs an update process of the pixel value. In the update process, a pixel value $\lambda_k^{(l+1)}$ as an updated pixel value is determined according to the equation (D1). In other words, the latest sum calculation result of the expression (D1b) determined in Step S27 is multiplied by $\lambda_k^{(l)}$, and hence the pixel value $\lambda_k^{(l+1)}$ of each pixel of the distribution image is determined. After that, in Step S31, the main arithmetic portion 30 checks whether or not a predetermined update end condition is satisfied. If the update end condition is satisfied, the process proceeds to Step S33, in which the distribution image having the latest each pixel value $\lambda_k$ is stored in the storage portion 44, and then the operation of FIG. 22 is finished. If the update end condition is not satisfied, one is added to the variable 1 in Step S32, and the process returns to Step S22 so that the processes after Step S22 are repeated.

The update end condition is satisfied when the number of execution times of the update process in Step S30 reaches a predetermined number of times, for example. Alternatively, for example, the update end condition may be satisfied when a predetermined end instruction operation is input to the operation portion 43 in the execution of repeating the processes of Steps S22 to S32. Further, alternatively, for example, the update end condition may be satisfied when a variation of each pixel value $\lambda_k$ by the update process in Step S30 becomes sufficiently small (for example, a difference between the sum of the pixel value $\lambda_k^{(l+1)}$ and the sum of the pixel value $\lambda_k^{(l)}$ in all pixels of the distribution image becomes a predetermined value or less).

<<Second Improved Method for Generating Distribution Image>>

A second improved method for generating the distribution image is described. In the second improved method, the distribution image is generated based on the following equation (E1). In the equation (E1), $v_{ij}$ is introduced based on the reference method, but $s_{ij}$ is not introduced. Except that $s_j$ is incorporated in the equation for calculating the pixel value $\lambda_j$ instead of $s_{ij}$, the second improved method is the same as the first improved method. The detection sensitivity parameter $s_j$ is determined for each pixel according to the following equation (E2), for example.

[Mathematical 12]

$$\lambda_j^{(l+1)} = \frac{\lambda_j^{(l)}}{s_j} \sum_i \frac{v_{ij} t_{ij}}{\sum_k t_{ik} \lambda_k^{(l)}} \quad (E1)$$

$$s_j = \sum_p \exp[-\sigma_t(E_0) d_{p,j1}] \cdot |R_p - r_j|^{-2} \quad (E2)$$

As described above, $\sigma_t(E_0)$ represents the all interaction cross-sectional area between the gamma ray having energy $E_0$ and the detector substance, and $r_j$ represents a position (center position) of the pixel j. In the equation (E2), p represents a number of a detector element among first to (m×n×o)th detector elements forming the detector 11 (see FIGS. 21A and 21B), and $R_p$ represents the center position of the p-th detector element. Symbol $d_{p,j1}$ represents a length of a path positioned in the detector 11 as a part of a straight line path from the position $r_j$ to the position $R_p$. In other words, $d_{p,j1}$ represents a distance that the gamma ray from the pixel j travels in the detector 11 until reaching the p-th detector element, similarly to $d_{i,j1}$ in FIG. 20. Therefore, "$\exp[-\sigma_t(E_0) d_{p,j1}]$" in the equation (E2) represents a probability that the gamma ray from the pixel j reaches the p-th detector element without interaction with the detector substance in the detector 11. "$|R_p - r_j|^{-2}$" represents an approximation of the geometrical efficiency of the p-th detector element viewed from the pixel j. The sum of the gamma ray detection sensitivity "$\exp[-\sigma_t(E_0) d_{p,j1}] \cdot |R_p - r_j|^{-2}$" for all detector elements is $s_j$ in the equation (E2).

As understood from comparison with the equation (D4) defining $s_{ij}$, $s_j$ in the equation (E2) is calculated as the sum of the detection sensitivity (gamma ray detection sensitivity) set for all detector elements. Because the number of the detector elements is a fixed number, the sum of the detection sensitivity is substantially regarded as an average value of the detection sensitivity of all detector elements. A size of each detector element is the product of X-axis, Y-axis, and Z-axis components of position detection accuracy of the detector 11 (for example, 3×3×1 mm³).

Note that, in the case where the image space IS is sufficiently smaller than a size of the detector 11 or other cases, it is possible to regard the detection sensitivity to be uniform so as to set one to $s_j$ for all pixels.

In the second improved method, in comparison with the reference method, an advantageous effect can be obtained by introducing $v_{ij}$. However, the first improved method, in which $s_{ij}$ is also introduced, is more suitable for generating an accurate distribution image than the second improved method.

<<Third Improved Method for Generating Distribution Image>>

A third improved method for generating the distribution image is described. In the third improved method, the distribution image is generated based on the following equation (F1) or (F2). In the equation (F1) or (F2), $s_{ij}$ is introduced based on the reference method, but $v_{ij}$ is not introduced. Except that, instead of $v_{ij}$, $Y_i$ or $v_i$ is incorporated in the equation for calculating the pixel value $\lambda_j$, the third improved method is the same as the first improved method.

[Mathematical 13]

$$\lambda_j^{(l+1)} = \lambda_j^{(l)} \sum_i \frac{Y_i t_{ij}}{s_{ij} \sum_k t_{ik} \lambda_k^{(l)}} \quad (F1)$$

$$\lambda_j^{(l+1)} = \lambda_j^{(l)} \sum_i \frac{v_i t_{ij}}{s_{ij} \sum_k t_{ik} \lambda_k^{(l)}} \quad (F2)$$

As described above, $Y_i$ may be "1" in all events. A probability parameter $v_i$ is set for each event, and one probability parameter $v_i$ is commonly used for each pixel. For example, the probability parameter $v_i$ is calculated according to the following equation (F3). The right side of the equation (F3) represents the sum of $p_{ij}$ for all pixels within the Compton conical surface area in the i-th event.

[Mathematical 14]

$$v_i = \sum_j p_{ij} \quad (F3)$$

In the third improved method, in comparison with the reference method, an advantageous effect can be obtained by introducing $s_{ij}$. However, the first improved method, in which $v_{ij}$ is also introduced, is more suitable for generating an accurate distribution image than the third improved method. Also by using $v_i$ instead of $v_{ij}$, the artifact can be reduced in comparison with the reference method. However, as understood from the above description with reference to FIGS. 15, 16A, and 16B, the first improved method in which optimal $v_{ij}$ is set for each pixel in each event has higher effect of reducing the artifact.

[Result of Experiment]

There are described contents and results of the experiment using the reference method, the first improved method, and the second improved method. FIG. 23 is a schematic plan view of a tumor-bearing mouse used in the experiment. A tumor-bearing mouse, to which three tumor tissues A431, 4T1, and C6 are transplanted, is administrated with $^{64}$Cu labeled anti-HER2 antibody to be the imaging target 200. The $^{64}$Cu labeled anti-HER2 antibody is an antibody containing $^{64}$Cu and is an antibody that is accumulated in a tumor containing HER2. Among three tumor tissues, the tumor tissue A431 has the highest expression of HER2, and hence it is expected that the antibody is highly accumulated in the tumor tissue A431. In this experiment, $^{64}$Cu in the tumor-bearing mouse functions as the gamma ray source 201, and the gamma rays of 511 kiloelectronvolts (keV) due to annihilation of positrons emitted from $^{64}$Cu function as the gamma rays from the gamma ray source 201. In the experiment, an imaging time using the Compton camera 10 is 9 hours, and the number of measured events is $1.9\times10^6$.

The three-dimensional distribution images obtained as results of the experiment of the reference method, the second improved method, and the first improved method are referred to as three-dimensional distribution images 610, 620, and 630, respectively (see FIG. 24). The number of repetition times of the iterative calculation in the experiment is uniformly 60. In other words, under the experiment condition, the three-dimensional distribution image 610, 620, and 630 are three-dimensional distribution images respectively having $\lambda_j^{(60)}$ as a pixel value of the pixel j in the equations (B1), (E1), and (D1).

Figure 25:
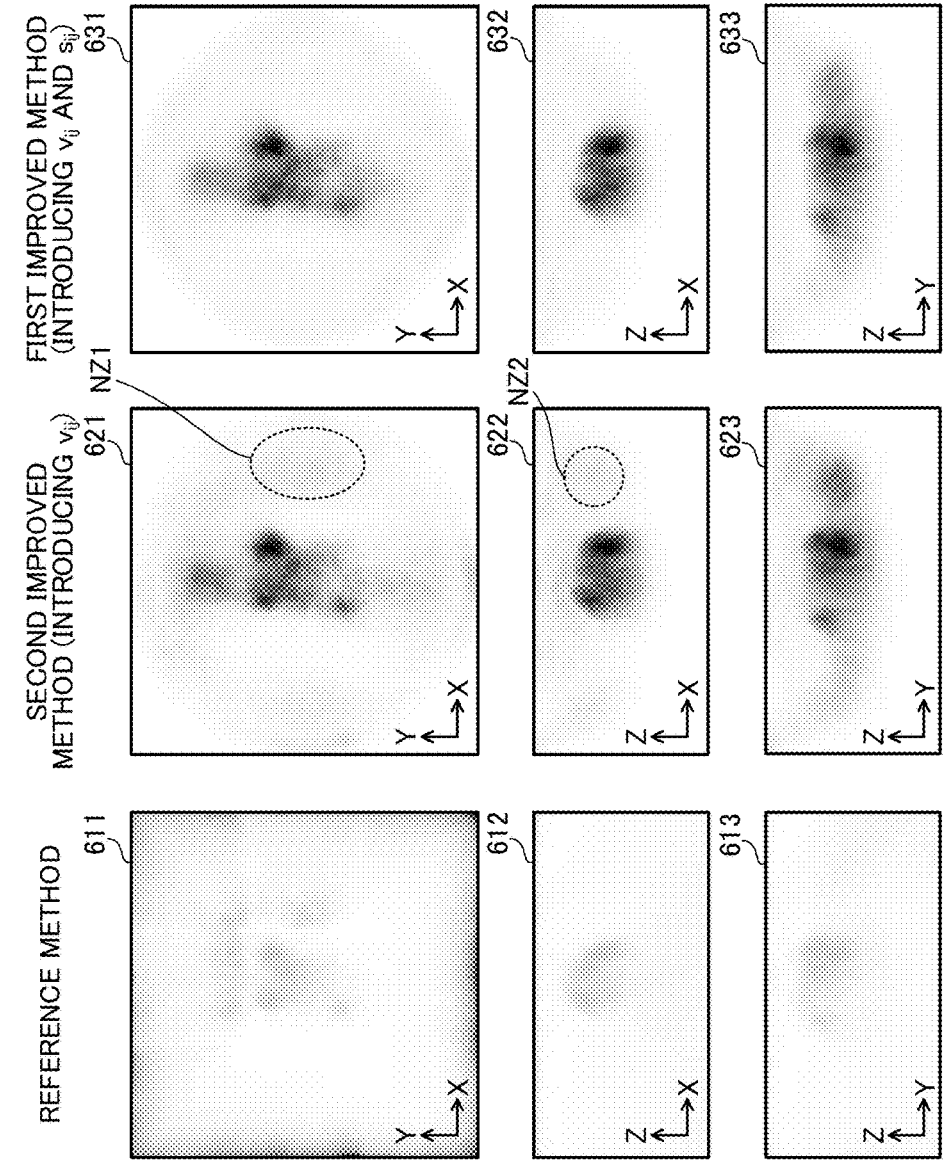
FIG. 25 is a diagram illustrating (total nine) two-dimensional distribution images cut out from each of the three three-dimensional distribution images obtained in the experiment.

FIG. 25 illustrates two-dimensional MIP images 611 to 613 based on the three-dimensional distribution image 610, two-dimensional MIP images 621 to 623 based on the three-dimensional distribution image 620, and two-dimensional MIP images 631 to 633 based on the three-dimensional distribution image 630. The MIP images 611, 612, and 613 are plane images obtained by projecting the three-dimensional distribution image 610 to the XY plane, the ZX plane, and the YZ plane, respectively, using a maximum intensity projection method. Similarly, the MIP images 621, 622, and 623 are plane images obtained by projecting the three-dimensional distribution image 620 to the XY plane, the ZX plane, and the YZ plane, respectively, using the maximum intensity projection method. Similarly, the MIP images 631, 632, and 633 are plane images obtained by projecting the three-dimensional distribution image 630 to the XY plane, the ZX plane, and the YZ plane, respectively, using the maximum intensity projection method. In other words, for example, a unit operation, in which the pixel having the maximum pixel value among pixels having the same positions in the X-axis and Y-axis directions in the three-dimensional distribution image 610 is projected to the XY plane, is performed over the entire of the three-dimensional distribution image 610, and hence the MIP image 611 is formed in the XY plane that is a projection plane. The same is true for the MIP images 612 and 613. In addition, the same is true for the MIP images 621 to 623 and 631 to 633.

In the distribution image according to the reference method, a strong artifact due to overfitting is generated in a periphery of the image space IS (see particularly image 611), while such artifact is reduced in the second improved method and the first improved method (see, in particular, images 621 and 631). In addition, a blurred contour of the tumor tissue is conspicuous in the distribution image according to the reference method, while such blurred contour is reduced in the second improved method and the first improved method. In addition, a background noise observed in the distribution image according to the second improved method (for example, a noise in an area NZ1 of the image 621 or an area NZ2 of the image 622) is reduced in the first improved method. Although it is difficult to recognize in FIG. 25, it is found that a contrast of each tumor tissue (particularly A431) in the distribution image according to the first improved method is higher than that according to the second improved method.

Figure 26:
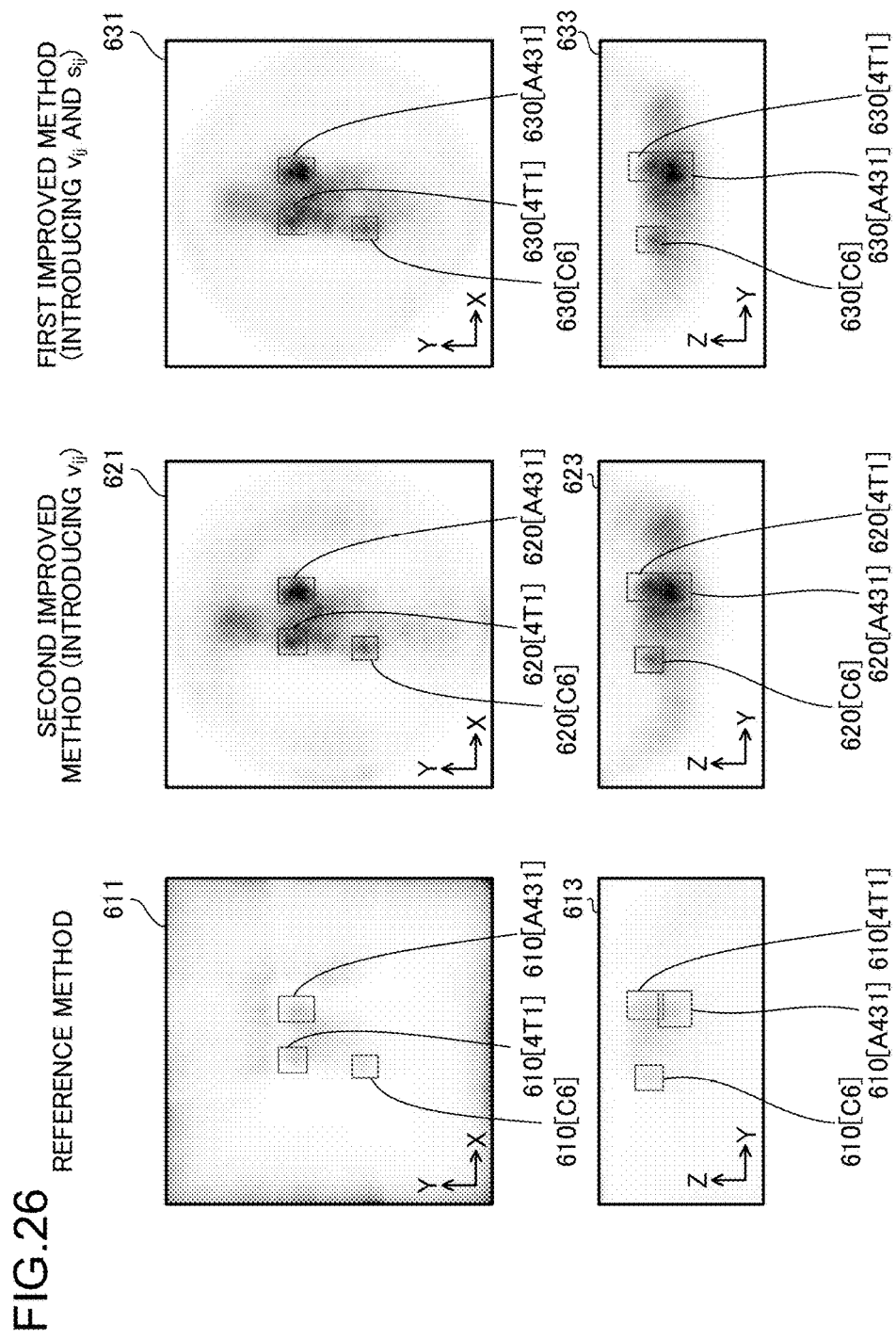
FIG. 26 is diagram for explaining contents of setting areas to be used for VOI evaluation.

Next, in order to evaluate whether or not radioactivity accumulated in an actual tissue is reflected on the pixel intensity (pixel value) of each distribution image, a volume of interest (VOI) analysis was performed. In the VOI analysis, as illustrated in FIG. 26, areas 610[A431], 610[4T1], and 610[C6], in which tumor tissues A431, 4T1, and C6 exist, are set in the three-dimensional distribution image 610, and areas 620[A431], 620[4T1], and 620[C6], in which tumor tissues A431, 4T1, and C6 exist, are set in the three-dimensional distribution image 620, and areas 630[A431], 630[4T1], and 630[C6], in which tumor tissues A431, 4T1, and C6 exist, are set in the three-dimensional distribution image 630. Sizes of the areas set with respect to the tumor tissue A431 (namely, the areas 610[A431], 620[A431], and 630[A431]) are the same among the images 610, 620, and 630. The same is true for the areas set with respect to the tumor tissues 4T1 and C6.

Figure 27:
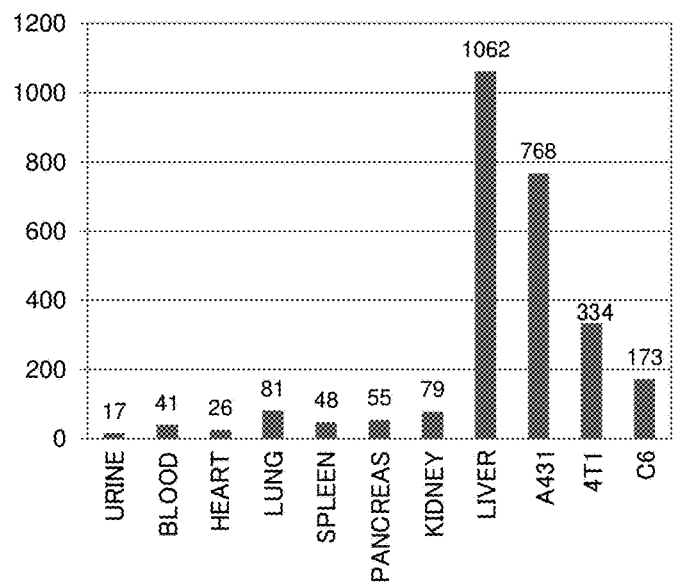
FIG. 27 is a diagram illustrating a result of measurement of radioactivity from each tissue of the tumor-bearing mouse after an imaging experiment.
Figure 28:
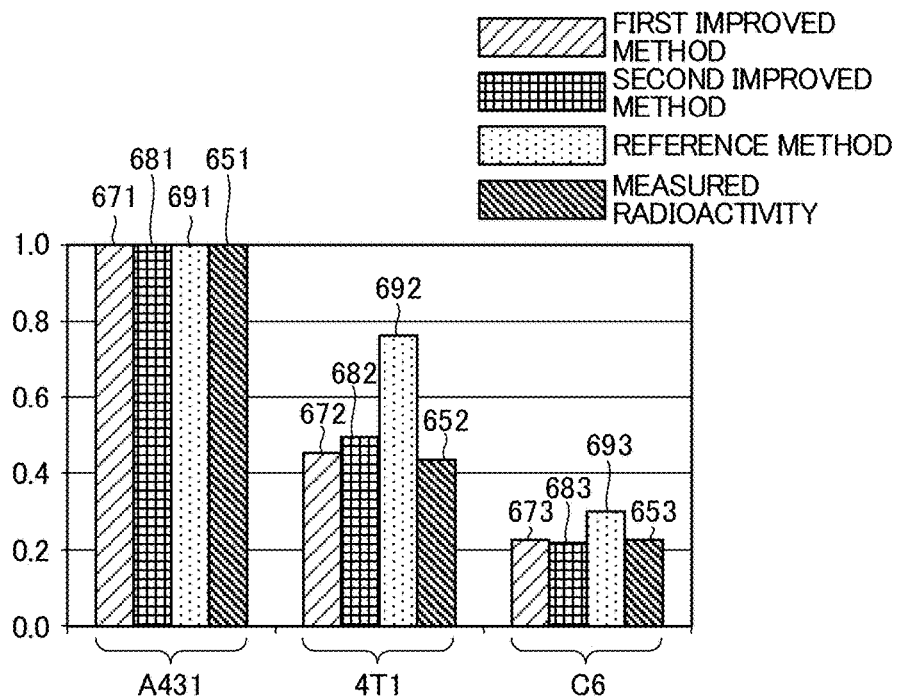
FIG. 28 is a graph illustrating a result of measuring radioactivity from each tissue and a result of the VOI evaluation.

FIG. 27 illustrates a result of measuring radioactivity of $^{64}$Cu from each tissue of the tumor-bearing mouse after the imaging experiment. In FIG. 28, in the bar graph including bars 651 to 653, normalization is performed so that measured radioactivity from the tumor tissue A431 indicated by the bar 651 becomes 1.0, and then measured radioactivity from the tumor tissues 4T1 and C6 are indicated by the bars 652 and 653, respectively.

Relative intensities shown by bars 671 to 673 in FIG. 28 respectively indicate the sums of pixel values in the areas 630[A431], 630[4T1], and 630[C6] based on the first improved method. However, as to the relative intensities shown by the bars 671 to 673, normalization is performed so that the relative intensity corresponding to the area 630[A431] becomes 1.0.

Relative intensities shown by bars 681 to 683 in FIG. 28 respectively indicate the sums of pixel values in the areas 620[A431], 620[4T1], and 620[C6] based on the second improved method. However, as to the relative intensities shown by the bars 681 to 683, normalization is performed so that the relative intensity corresponding to the area 620[A431] becomes 1.0.

Relative intensities shown by bars 691 to 693 in FIG. 28 respectively indicate the sums of pixel values in the areas 610[A431], 610[4T1], and 610[C6] based on the reference method. However, as to the relative intensities shown by the bars 691 to 693, normalization is performed so that the relative intensity corresponding to the area 610[A431] becomes 1.0.

In the graph of FIG. 28, as the relative intensities of the tumor tissues 4T1 and C6 viewed from the relative intensity (1.0) of the tumor tissue A431 are close to those for the measured radioactivity (the intensities of the bars 652 and 653 viewed from the intensity of the bar 651), quantitatively of the image can be said to be superior.

In comparison with the intensities of the bars 692 and 693 viewed from the intensity of the bar 691, the intensities of the bars 672 and 673 viewed from the intensity of the bar 671, and the intensities of the bars 682 and 683 viewed from the intensity of the bar 681 are both close to the intensities of the bars 652 and 653 viewed from the intensity of the bar 651. In other words, in comparison with the reference method, quantitativity of the image is improved in the first or the second improved method.

<<Variations>>

The embodiments of the present invention can be appropriately modified variously within the scope of the technical spirit described in the claims. The embodiments described above are merely examples of the embodiments of the present invention, and meanings of the terms of the present invention and the structural elements are not limited to those described above in the embodiments. Specific values shown in the above description are merely examples and can be changed variously, as a matter of course.

A target device as the imaging device 1 itself or a target device as a part of the imaging device 1 (for example the main arithmetic portion 30) can be constituted of hardware such as an integrated circuit or a combination of hardware and software. An arbitrary specific function as a whole or a part of functions realized by the target device may be described as a program, and the program may be stored in a memory (such as a flash memory) mountable in the target device. Then, the program may be executed by a program execution device (for example a microcomputer mountable in the target device) so that the specific function is realized. The program can be stored and secured in an arbitrary recording medium. The recording medium for storing and securing the program may be mounted in or connected to a device (such as a server device) other than the target device.

For example, the following consideration can be made. The imaging device 1 includes an event detection unit for detecting the event and an arithmetic unit for generating the distribution image. The event detection unit is mainly realized by the event measurement data obtaining portion 20, for example, and the arithmetic unit is mainly realized by the main arithmetic portion 30, for example (see FIG. 3). The arithmetic unit (30) can be said to include a conical surface setting unit (S21; FIG. 22) configured to set the Compton conical surface for each event, a conical surface area setting unit (S22; FIG. 22) configured to set the Compton conical surface area for each event, a probability parameter setting unit (S23; FIG. 22) configured to set the probability parameter $v_{ij}$ for each event and for each pixel (target pixel), and a detection sensitivity parameter setting unit (S23; FIG. 22) configured to set the detection sensitivity parameter $s_{ij}$ for each event and for each pixel (target pixel).

EXPLANATION OF NUMERALS 1 gamma ray source distribution imaging device
10 Compton camera
11 first-stage detector
12 second-stage detector
20 event measurement data obtaining portion
30 main arithmetic portion
200 imaging target
201 gamma ray source
$R_1$, $R_{i1}$ interaction position (Compton scattering position)
$R_2$, $R_{i2}$ interaction position (all energy absorption position)
$\theta_C$ Compton scattering angle
IS image space

The invention claimed is:
1. An imaging device comprising:
a first-stage detector and a second-stage detector, wherein the first-stage detector is disposed between a gamma ray source and the second-stage detector;
an event detection unit configured to detect an event in which a gamma ray that is Compton scattered by the first-stage detector is photoelectrically absorbed by the second-stage detector; and
an arithmetic unit configured to generate a distribution image indicating a spatial distribution of the gamma ray source as an image in an image space enclosing the gamma ray source, on the basis of measurement data of interaction of each detector and gamma rays in a plurality of events, wherein the arithmetic unit individually sets a probability parameter indicating a probability that Compton-scattered gamma ray arrived from within the image space in each event, for each of a plurality of pixels in the distribution image, on the basis of the measurement data of each event, and the arithmetic unit generates the distribution image using the set probability parameter.

2. The imaging device according to claim 1, wherein the arithmetic unit includes
a conical surface setting unit configured to set a conical surface having a vertex at a Compton scattering position, a half vertex angle equal to a Compton scattering angle, and a center axis on a straight line of a propagation path of the gamma ray after the Compton scattering, for each event, on the basis of the measurement data,
a conical surface area setting unit configured to set a conical surface area by assigning a thickness to the conical surface for each event, on the basis of a scattering angle distribution function indicating uncertainty of the Compton scattering angle, and
a probability parameter setting unit configured to set the probability parameter for the each event and for the each pixel, on the basis of a crossing state among a spherical surface having a center at the Compton scattering position and a radius equal to a distance between a position of the pixel and the Compton scattering position, the conical surface area, and the image space.

3. The imaging device according to claim 2, wherein the probability parameter setting unit extracts each pixel disposed in a crossing area among the spherical surface, the conical surface area, and the image space for the each event and for the each pixel, derives an index corresponding to intensity of the scattering angle distribution function for the extracted each pixel, and sets the probability parameter on the basis of a sum of the index derived for the extracted each pixel.

4. The imaging device according to claim 2, wherein the arithmetic unit sets the probability parameter for each pixel within the conical surface area for the each event.

5. The imaging device according to claim 1, wherein the arithmetic unit sets a detection sensitivity parameter indicating a detection sensitivity of Compton scattering in each event individually for each of the plurality of pixels on the basis of the measurement data of each event, so as to generate the distribution image using the set detection sensitivity parameter and the set probability parameter.

6. The imaging device according to claim 5, wherein the arithmetic unit includes a detection sensitivity parameter setting unit configured to set the detection sensitivity parameter for the each event and for the each pixel, in accordance with the Compton scattering position and the position of the pixel.

7. The imaging device according to claim 6, wherein the detection sensitivity parameter setting unit sets the detection sensitivity parameter for the each event and for the each pixel, on the basis of a range of the gamma ray before being Compton scattered in the first-stage detector based on the Compton scattering position and the position of the pixel, and a distance between the Compton scattering position and the position of the pixel.

8. The imaging device according to claim 2, wherein
the arithmetic unit includes a detection sensitivity parameter setting unit configured to individually set the detection sensitivity parameter indicating a detection sensitivity of Compton scattering in each event for each of the plurality of pixels based on the measurement data in each event, so as to generate the distribution image using the detection sensitivity parameter and the probability parameter,
the detection sensitivity parameter setting unit sets the detection sensitivity parameter for the each event and for the each pixel, on the basis of a range of the gamma ray before being Compton scattered in the first-stage detector based on the Compton scattering position and the position of the pixel, and a distance between the Compton scattering position and the position of the pixel, and
the arithmetic unit derives a pixel value of each pixel in the distribution image by iterative calculation according to the following equation:

[Mathematical 1]

$$\lambda_j^{(l+1)} = \lambda_j^{(l)} \sum_i \frac{v_{ij} t_{ij}}{s_{ij} \sum_k t_{ik} \lambda_k} \quad (1)$$

where $\lambda_j^{(l)}$ and $\lambda_j^{(l+1)}$ represent pixel values of a j-th pixel of the distribution image obtained by a l-th and a (l+1)th iterative calculations, respectively, and $t_{ij}$, $v_{ij}$, and $s_{ij}$ respectively represent a system response function, the probability parameter, and the detection sensitivity parameter set for the j-th pixel in an i-th event on the basis of the measurement data in the i-th event.

9. The imaging device according to claim 1, wherein the measurement data indicates a Compton scattering position of the gamma ray and energy lost by the gamma ray due to the Compton scattering in the first-stage detector, and a photoelectric absorption position and photoelectric absorption energy of the gamma ray in the second-stage detector, in each event.

10. An imaging device comprising:
a first-stage detector and a second-stage detector, wherein the first-stage detector is disposed between a gamma ray source and the second-stage detector;
an event detection unit configured to detect an event in which a gamma ray that is Compton scattered by the first-stage detector is photoelectrically absorbed by the second-stage detector; and
an arithmetic unit configured to generate a distribution image indicating a spatial distribution of the gamma ray source on the basis of measurement data of interaction of each detector and gamma rays in a plurality of events, wherein
the arithmetic unit individually sets a detection sensitivity parameter indicating a detection sensitivity of Compton scattering in each event for each of a plurality of pixels in the distribution image on the basis of the measurement data of each event, and the arithmetic unit generates the distribution image using the set detection sensitivity parameter.

11. The imaging device according to claim 10, wherein the arithmetic unit includes a detection sensitivity parameter setting unit configured to set the detection sensitivity parameter for the each event and for the each pixel, in accordance with a Compton scattering position and a position of the pixel.

12. The imaging device according to claim 11, wherein the detection sensitivity parameter setting unit sets the detection sensitivity parameter for the each event and for the each pixel, on the basis of a range of the gamma ray before being Compton scattered in the first-stage detector based on the Compton scattering position and the position of the pixel, and a distance between the Compton scattering position and the position of the pixel.

13. The imaging device according to claim 10, wherein the arithmetic unit includes
   a conical surface setting unit configured to set a conical surface having a vertex at a Compton scattering position, a half vertex angle equal to a Compton scattering angle, and a center axis on a straight line of a propagation path of the gamma ray after the Compton scattering, for each event, on the basis of the measurement data, and
   a conical surface area setting unit configured to set a conical surface area by assigning a thickness to the conical surface for each event, on the basis of a scattering angle distribution function indicating uncertainty of the Compton scattering angle, so as to set the detection sensitivity parameter for each pixel in the conical surface area for the each event.

14. The imaging device according to claim 10, wherein the measurement data indicates a Compton scattering position of the gamma ray and energy lost by the gamma ray due to the Compton scattering in the first-stage detector, and a photoelectric absorption position and photoelectric absorption energy of the gamma ray in the second-stage detector, in each event.

15. An imaging method used by a Compton camera including a first-stage detector and a second-stage detector, wherein the first-stage detector is disposed between a gamma ray source and the second-stage detector, for generating a distribution image indicting a spatial distribution of the gamma ray source as an image in an image space enclosing the gamma ray source, on the basis of measurement data of interaction of each detector and gamma rays in each event in which a gamma ray that is Compton scattered by the first-stage detector is photoelectrically absorbed by the second-stage detector, the method comprising:
   individually setting a probability parameter indicating a probability that Compton-scattered gamma ray arrived from within the image space in each event, for each of a plurality of pixels in the distribution image, on the basis of the measurement data of each event; and
   generating the distribution image using the set probability parameter.

16. An imaging method used by a Compton camera including a first-stage detector and a second-stage detector, wherein the first-stage detector is disposed between a gamma ray source and the second-stage detector, for generating a distribution image indicating a spatial distribution of the gamma ray source, on the basis of measurement data of interaction of each detector and gamma rays in each event in which a gamma ray that is Compton scattered by the first-stage detector is photoelectrically absorbed by the second-stage detector, the method comprising:
   individually setting a detection sensitivity parameter indicating a detection sensitivity of Compton scattering in each event for each of a plurality of pixels in the distribution image, on the basis of the measurement data of each event; and
   generating the distribution image using the set detection sensitivity parameter.

* * * * *